United States Patent
Johns et al.

(10) Patent No.: US 7,095,416 B1
(45) Date of Patent: Aug. 22, 2006

(54) FACILITATING PERFORMANCE ANALYSIS FOR PROCESSING

(75) Inventors: Kyle R. Johns, Sammamish, WA (US); J. Andrew Goossen, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 245 days.

(21) Appl. No.: 10/667,940

(22) Filed: Sep. 22, 2003

(51) Int. Cl.
*G06T 1/00* (2006.01)
*G06F 9/44* (2006.01)
*G06F 9/40* (2006.01)

(52) U.S. Cl. .......... 345/522; 717/127; 712/205
(58) Field of Classification Search ........... 345/522, 345/530, 559; 712/205; 717/127; 702/186; 463/40
See application file for complete search history.

(56) References Cited

U.S. PATENT DOCUMENTS

| | | | |
|---|---|---|---|
| 5,805,173 A * | 9/1998 | Glennon et al. ......... 345/501 |
| 5,970,439 A * | 10/1999 | Levine et al. ......... 702/186 |
| 6,173,368 B1 * | 1/2001 | Krueger et al. ......... 711/135 |
| 6,199,199 B1 | 3/2001 | Johnston et al. |
| 6,446,029 B1 * | 9/2002 | Davidson et al. ......... 702/186 |
| 6,468,160 B1 | 10/2002 | Eliott |
| 6,557,167 B1 * | 4/2003 | Thelen ......... 717/127 |
| 6,631,423 B1 * | 10/2003 | Brown et al. ......... 719/323 |
| 6,712,704 B1 | 3/2004 | Eliott |
| 6,769,989 B1 | 8/2004 | Smith et al. |
| 2003/0232648 A1 * | 12/2003 | Prindle ......... 463/40 |
| 2004/0003370 A1 * | 1/2004 | Schenk et al. ......... 717/100 |
| 2004/0162137 A1 | 8/2004 | Eliott |

OTHER PUBLICATIONS

Ammar, et al.; "Graphic Modelling Technique For Software Execution Time Estimation"; Information and Software Technology, 1991, vol. 33, No. 2; Mar.; pp. 151-156.
Ikedo; "Design and Performance Evaluation of a Pixel Cache Implemented Within Application-Specific Integrated Circuits"; Visual Computer, 1996, vol. 12, No. 5, pp. 215-233.
Doing; "Hard-Tuning the PS 2", Slides presented at Game Developers Conference Europe 2002, Aug. 27-29, 2002; 36 pages.
Lemarie; "Performance Analyser Play Your Game Cycle by Cycle"; Slides presented at Australian Game Developer Conference 2002, Dec. 7, 2002; 36 pages.
"Performance Analyzer+Real World Examples" printed Sep. 16, 2003 from Sony Computer Entertainment Europe Technology Group web site (www.scee.sony.co.uk/sceesite/articles.html, PerformanceAnalyzer.pdf), 4 pages.
Bender, et al.; "Introduction to the Performance Analyzer for PlayStation2"; Game Developers Conference, Mar. 6-8, 2003; 57 pages.

* cited by examiner

*Primary Examiner*—Ulka Chauhan
*Assistant Examiner*—Joni Hsu
(74) *Attorney, Agent, or Firm*—Lee & Hayes, PLLC

(57) ABSTRACT

Facilitating performance analysis for processing includes capturing a state of a processing unit and capturing a plurality of commands submitted to the processing unit for processing. Both the captured state and the captured plurality of commands are also saved. The saved state and commands can be used for analysis, such as by processing only a subset of the commands or processing a modified set of the commands.

15 Claims, 27 Drawing Sheets

400

| Event | ID | CPU Start (ns) | CPU Duration (ns) | GPU Start (ns) | GPU Duration (ns) | % of Total Time | Back-end Time (ns) | Setup Time (ns) |
|---|---|---|---|---|---|---|---|---|
| KickPushBuffer | 0 | 0 | 14,449 | - | - | - | - | - |
| FrameMove | 1 | 36,612 | 101,750 | - | 0 | - | - | - |
| Clear | 3 | 144,537 | 4,698 | 15,745,863 | 48,640 | - | - | - |
| Begin/End | 4 | 181,781 | 29,929 | 15,794,503 | 331,584 | - | - | - |
| Bear Mesh 0 | | | | | | | | |
| DrawIndexedVertices | 6 | 252,563 | 125,782 | 16,126,087 | 278,176 | - | - | - |
| KickPushBuffer | 7 | 339,091 | 5,501 | - | - | - | - | - |
| KickPushBuffer | 8 | 374,790 | 3,385 | - | - | - | - | - |
| DrawIndexedVertices | 9 | 386,209 | 10,399 | 16,404,263 | 3,072 | - | - | - |
| DrawIndexedVertices | 10 | 401,332 | 6,393 | 16,407,335 | 2,656 | - | - | - |
| Bear Mesh 1 | 11 | 409,555 | 56,960 | 16,409,991 | 45,568 | - | - | - |
| Bear Mesh 2 | 15 | 466,773 | 39,522 | 16,455,559 | 74,208 | - | - | - |
| Bear Mesh 3 | 19 | 506,536 | 91,996 | 16,529,767 | 59,072 | - | - | - |
| Bear Mesh 4 | 25 | 598,778 | 53,437 | 16,588,839 | 47,232 | - | - | - |
| Bear Mesh 5 | 29 | 652,769 | 39,348 | 16,636,071 | 47,552 | - | - | - |
| Bear Mesh 6 | 33 | 692,356 | 37,207 | 16,683,623 | 45,248 | - | - | - |
| Bear Mesh 7 | 37 | 729,799 | 92,051 | 16,728,871 | 50,783 | - | - | - |
| Bear Fur 7 | | | | | | | | |
| DrawFins | 44 | 852,610 | 122,595 | 16,779,656 | 156,932 | - | - | - |
| DrawShells | 73 | 975,455 | 40,536 | 16,936,616 | 61,407 | - | - | - |
| Bear Fur 6 | 75 | 1,019,798 | 117,933 | 16,998,024 | 219,011 | - | - | - |
| Bear Fur 5 | 107 | 1,138,001 | 7,341,552 | 17,217,064 | 224,739 | - | - | - |
| Bear Fur 4 | 142 | 8,479,990 | 164,020 | 17,441,832 | 284,642 | - | - | - |

| Event | Symbol | Line | File |
|---|---|---|---|
| BlockOnObject | D3D::BlockOnTime | 537 | c:\xbox\private\windows\directx\dxg\d3d8\se\pusher.cpp |
| | D3D::BlockOnNonSurfaceResource | 1287 | c:\xbox\private\windows\directx\dxg\d3d8\se\pusher.cpp |
| | D3DFixup_Reset | 1857 | c:\xbox\private\windows\directx\dxg\d3d8\se\pushres.cpp |
| | CXBoxSample::FrameMove | 363 | c:\xbox\private\atg\samples\graphics\pushbuffer\pushbuffer.cpp |
| | CXBApplication::Run | 294 | c:\xbox\private\atg\samples\common\src\xbapp.cpp |
| | main | 108 | c:\xbox\private\atg\samples\graphics\pushbuffer\pushbuffer.cpp |
| | mainXapiStartup | 54 | c:\xbox\private\ntos\xapi\dll\xapi0.c |
| Clear | D3DDevice_Clear | 74 | c:\xbox\private\windows\directx\dxg\d3d8\se\clear.cpp |
| | CXBoxSample::Render | 383 | c:\xbox\private\atg\samples\graphics\pushbuffer\pushbuffer.cpp |
| | main | 108 | c:\xbox\private\atg\samples\graphics\pushbuffer\pushbuffer.cpp |
| | mainXapiStartup | 54 | c:\xbox\private\ntos\xapi\dll\xapi0.c |
| RunPushBuffer | D3DDevice_RunPushBuffer | 122 | c:\xbox\private\windows\directx\dxg\d3d8\se\pushres.cpp |
| | CXBoxSample::Render | 386 | c:\xbox\private\atg\samples\graphics\pushbuffer\pushbuffer.cpp |
| | main | 108 | c:\xbox\private\atg\samples\graphics\pushbuffer\pushbuffer.cpp |
| | mainXapiStartup | 54 | c:\xbox\private\ntos\xapi\dll\xapi0.c |
| DrawVerticesUP | | | |
| DrawVertices | | | |
| Begin/End | D3DDevice_Begin | 1196 | c:\xbox\private\windows\directx\dxg\d3d8\se\drawprim.cpp |
| | CXBFont::Begin | 448 | c:\xbox\private\atg\samples\common\src\xbfont.cpp |
| | CXBoxSample::Render | 387 | c:\xbox\private\atg\samples\graphics\pushbuffer\pushbuffer.cpp |
| | main | 108 | c:\xbox\private\atg\samples\graphics\pushbuffer\pushbuffer.cpp |
| | mainXapiStartup | 54 | c:\xbox\private\ntos\xapi\dll\xapi0.c |

452 — Path to Symbol File: c:\xboxbins\dump

Fig. 16

| ID | Event | Priority | Message |
|---|---|---|---|
| 3 | Clear | 3 | If all redundant state setting were perfectly eliminated, rendering of entire scene would be 0. |
| | | 2 | The CPU's floating point precision is set to 53 bits. Consider calling _controlfp(_PC_24, _MC |
| 4 | Begin/End | 3 | Vertex shader is writing to 9 output registers that are unused by the current pixel shader. |
| | | 3 | To make best use of pixel pipelines and swathing, use a single clipped triangle that covers t |
| 74 | DrawIndexedVertices | 3 | Vertex shader is writing to 1 output registers that are unused by the current pixel shader. |
| 106 | DrawIndexedVertices | 3 | Vertex shader is writing to 1 output registers that are unused by the current pixel shader. |
| 138 | DrawIndexedVertices | 3 | Vertex shader is writing to 1 output registers that are unused by the current pixel shader. |
| 173 | DrawIndexedVertices | 3 | Vertex shader is writing to 1 output registers that are unused by the current pixel shader. |
| 206 | DrawIndexedVertices | 3 | Vertex shader is writing to 1 output registers that are unused by the current pixel shader. |
| 210 | DrawIndexedVertices | 3 | Vertex shader is writing to 1 output registers that are unused by the current pixel shader. |
| 243 | DrawIndexedVertices | 3 | Vertex shader is writing to 1 output registers that are unused by the current pixel shader. |
| 247 | DrawIndexedVertices | 3 | Vertex shader is writing to 1 output registers that are unused by the current pixel shader. |
| 280 | DrawIndexedVertices | 3 | Vertex shader is writing to 1 output registers that are unused by the current pixel shader. |
| 282 | DrawIndexedVertices | 3 | Vertex shader is writing to 1 output registers that are unused by the current pixel shader. |
| 284 | DrawIndexedVertices | 3 | Vertex shader is writing to 1 output registers that are unused by the current pixel shader. |
| 288 | DrawIndexedVertices | 3 | Vertex shader is writing to 1 output registers that are unused by the current pixel shader. |
| 321 | DrawIndexedVertices | 3 | Vertex shader is writing to 1 output registers that are unused by the current pixel shader. |
| 325 | DrawIndexedVertices | 3 | Vertex shader is writing to 1 output registers that are unused by the current pixel shader. |
| 329 | DrawIndexedVertices | 3 | Vertex shader is writing to 1 output registers that are unused by the current pixel shader. |
| 333 | DrawIndexedVertices | 3 | Vertex shader is writing to 1 output registers that are unused by the current pixel shader. |
| 336 | Begin/End | 2 | D3DPRESENT_INTERVAL_ONE_OR_IMMEDIATE and D3DPRESENT_INTERVAL_TW( |

| Event | Pushbuffer | Size | Attributes |
|---|---|---|---|
| BlockOnObject | | | |
| Clear | Clear(D3DCLEAR_TARGET | D3DCLEAR_ZBUFFER | D3DCLEAR_STENCIL) | 28 | |
| RunPushBuffer | | | |
| DrawVerticesUP | D3DRS_PSCOMBINERCOUNT | 8 | Redundant |
| | D3DRS_PSRGBINPUTS* | 36 | Redundant |
| | D3DRS_PSRGBOUTPUTS* | 36 | Redundant |
| | D3DRS_PSALPHAINPUTS* | 36 | Redundant |
| | D3DRS_PSALPHAOUTPUTS* | 36 | Redundant |
| | LazySetShaderStageProgram | 8 | Redundant |
| | SetVertexShaderConstant | 44 | |
| | SetVertexShader/SelectVertexShader | 208 | |
| | LazySetSpecFogCombiner | 8 | Redundant |
| | D3DRS_PSFINALCOMBINERINPUTSABCD | 8 | |
| | D3DRS_PSFINALCOMBINERINPUTSEFG | 4 | |
| | LazySetState/SetVertexShaderInput | 100 | |
| | Jump | 4 | |
| | D3DRS_CULLMODE | 8 | |
| | D3DRS_ALPHABLENDENABLE | 532 | |
| | SetVertexShaderConstant | 76 | |
| | SetVertexShader/SelectVertexShader | 136 | |
| | CommonSetViewport | 52 | Redundant |
| | SetVertexShader/SelectVertexShader | 8 | Redundant |
| | D3DRS_PSCOMBINERCOUNT | 8 | |
| | D3DRS_PSRGBINPUTS* | 36 | |
| | D3DRS_PSRGBOUTPUTS* | 36 | |
| | D3DRS_PSALPHAINPUTS* | 36 | |

| Texture State | Value |
|---|---|
| Texture Unit 0 | |
| D3DTSS_ADDRESSU | D3DTADDRESS_WRAP |
| D3DTSS_ADDRESSV | D3DTADDRESS_WRAP |
| D3DTSS_ADDRESSW | D3DTADDRESS_WRAP |
| D3DTSS_ALPHAKILL | D3DTALPHAKILL_DISABLE |
| D3DTSS_BORDERCOLOR | 0x00000000 |
| D3DTSS_BUMPENVLOFFSET | - |
| D3DTSS_BUMPENVLSCALE | - |
| D3DTSS_BUMPENVMAT00 | - |
| D3DTSS_BUMPENVMAT01 | - |
| D3DTSS_BUMPENVMAT10 | - |
| D3DTSS_BUMPENVMAT11 | - |
| D3DTSS_COLORKEY | 0x00000000 |
| D3DTSS_COLORKEYOP | D3DTCOLORKEYOP_DISABLE |
| D3DTSS_COLORSIGN | 0 |
| D3DTSS_MAGFILTER | D3DTEXF_LINEAR |
| D3DTSS_MAXANISOTROPY | 0 |
| D3DTSS_MAXMIPLEVEL | 0 |
| D3DTSS_MINFILTER | D3DTEXF_LINEAR |
| D3DTSS_MIPFILTER | D3DTEXF_LINEAR |
| D3DTSS_MIPMAPLODBIAS | 0.000 |
| D3DTSS_TEXCOORDINDEX | ? |
| D3DTSS_TEXTURETRANSFORMFLAGS | ? |
| Texture Unit 1 | |
| D3DTSS_ADDRESSU | D3DTADDRESS_WRAP |

FACILITATING PERFORMANCE ANALYSIS FOR PROCESSING

TECHNICAL FIELD

This invention relates to performance analysis, and more particularly to facilitating performance analysis for processing.

BACKGROUND

As computing technology has advanced, the hardware on which video games are run has also advanced and lead to increasingly complex video games. Such complexity can result in video games with excellent graphics and a wide range of actions that can be performed by the users. However, such complexity can also make it difficult for game designers to create video games.

Problems or errors encountered in building and designing video games oftentimes are resolved by "debugging" the instructions that make up the video game. Unfortunately, such debugging can be a very tedious and time-consuming process. For example, in order to maintain the desired playback rate for frames in a video game (typically a rate of 30 frames per second or 60 frames per second), each frame should require no more than a designated amount of time to be drawn (e.g., at 60 frames per second, each frame should require no more than 16.67 ms (milliseconds) to be drawn). If this designated amount of time is exceeded, then the video playback can appear slow and the on-screen action may not appear smooth. When the game designer sees portions of the video playback that are slow, he or she typically tries to debug the instructions by finding out why the designated amount of time is being exceeded, and changing the instructions so that the certain amount of time is no longer exceeded.

Such debugging, however, can be very difficult. One reason for this difficulty is that many video games are designed to be run on game systems that include a graphics processing unit (GPU). The GPU receives commands to draw various aspects of a scene, and renders the scene as indicated by these commands. Unfortunately, the GPU frequently provides very little feedback, if any, to the designer as to why the certain amount of time may be violated. As such, much of the debugging effort is reduced to a trial and error methodology. Thus, it would be beneficial to improve the quality and/or amount of information available to game designers as they build and test their video games.

SUMMARY

Facilitating performance analysis for processing is described herein.

According to certain aspects, a set of commands to be submitted to a processing unit is identified. A subset of the set of commands is selected and submitted to the processing unit for processing. The processing performed by the processing unit in response to the subset of the set of commands is analyzed.

According to other aspects, a stream of commands previously submitted to a processing unit is identified. The stream of commands are modified and the modified of commands are submitted to the processing unit. A difference between a first amount of time required by the processing unit to process the stream of commands and a second amount of time required by the processing unit to process the modified stream of commands is determined.

According to other aspects, a state of a graphics processing unit is captured. A plurality of commands submitted to the graphics processing unit in order to draw a frame of video is also captured. Both the captured state and the captured plurality of commands are saved.

BRIEF DESCRIPTION OF THE DRAWINGS

The same numbers are used throughout the document to reference like components and/or features.

FIG. 9 illustrates another example of an events window.

FIG. 16 illustrates an example of a call stack window that can be displayed as a frame window of FIG. 7.

FIG. 17 illustrates an example of a warning window that can be displayed as a frame window of FIG. 7.

FIG. 18 illustrates an example of a pushbuffer window that can be displayed as a frame window of FIG. 7.

Figure 20:
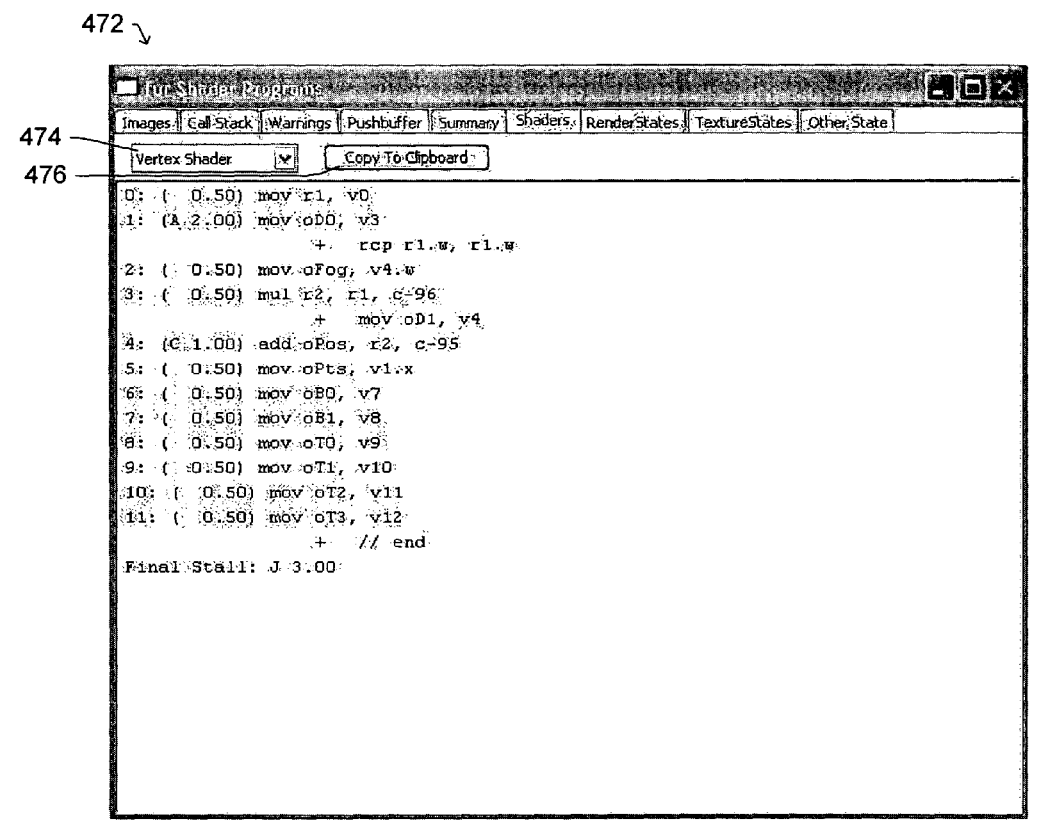

FIG. 20 illustrates an example of a shaders window that can be displayed as a frame window of FIG. 7.

FIG. 22 illustrates an example of a texturestates window that can be displayed as a frame window of FIG. 7.

FIG. 26 illustrates an example vertex shader debugger window that can be displayed.

DETAILED DESCRIPTION

Facilitating performance analysis for processing is described herein. Although discussed herein primarily with reference to graphics processing and graphics processing units, performance analysis for other types of processors can also be facilitated. Commands submitted to a graphics processing unit (GPU) for drawing a frame of video data are captured and saved. These captured commands can subsequently be modified and submitted to the GPU, and/or only some of the commands may be submitted to the GPU. By modifying the captured commands appropriately, and/or submitting appropriate subsets of the captured commands, a wide variety of information can be obtained regarding how the frame is being drawn.

Figure 1:
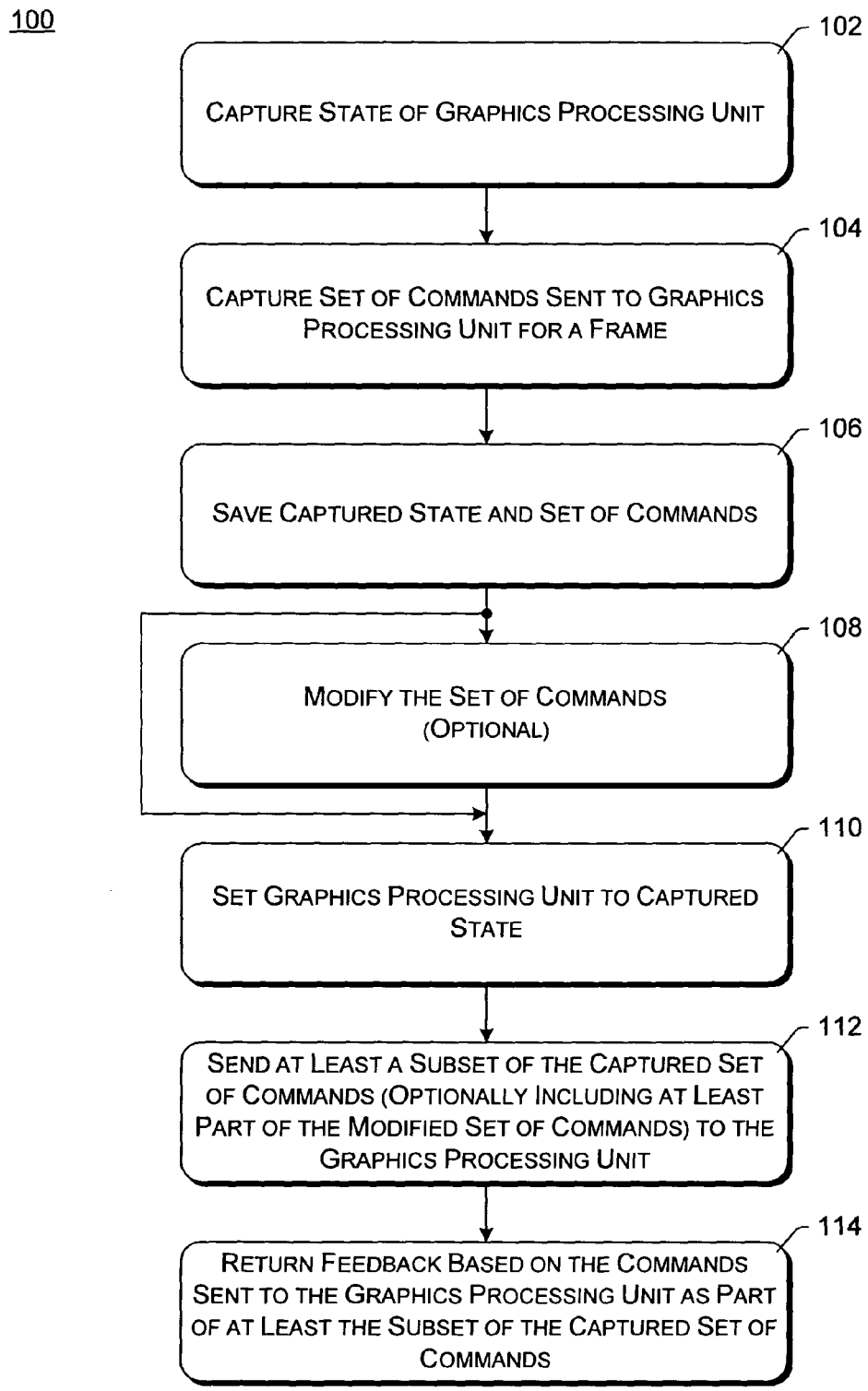
FIG. 1 is a flowchart illustrating an example process for facilitating performance analysis for graphics processing.

FIG. 1 is a flowchart illustrating an example process 100 for facilitating performance analysis for graphics processing. Process 100 can be implemented in hardware, software, firmware, or combinations thereof. Additionally, process 100 may be performed in a single device or alternatively in multiple devices.

In process 100, commands for drawing a frame of video data are captured and saved. The video data is typically the video portion of a video game, such as video games played on gaming consoles or computers. However, it is to be appreciated that the video data may be associated with other types of applications other than video games, such as educational or reference applications, simulation or emulation applications, productivity or office applications, and so forth.

Video is typically made up of a series of individual images which are played back sequentially. When played back at a fast enough rate, different objects within these images appear to the human eye to move smoothly. Each one of these individual images is referred to as a frame or a scene herein. Different rates of playback can be used, and the rates of 30 frames per second or 60 frames per second are commonly used with the NTSC (National TV Standards Committee) standard.

Process 100 is initiated by a request, typically from a user, to initiate a frame capture. In response to the request, the state of the graphics processing unit is captured (act 102) when drawing of the current frame is finished. Given the speed at which video frames are drawn, a request to capture a frame or scene is typically received while another frame or scene is being drawn. Process 100 waits until drawing of the current frame is finished so that all of the data desired to be captured for drawing an entire frame can be captured.

The state of the graphics processing unit refers to all of the registers, buffers, and/or other memory of the graphics processing unit in which variables or settings are stored. These variables or settings are used by the graphics processing unit in drawing frames. A variety of different variables or settings may be used, such as shading or lighting variables, transparency variables, and so forth. Many of these variables and/or settings can be programmed by the game designer, and thus their settings are relevant to the frame about to be drawn. For example, a frame being drawn may appear differently if transparency is turned on than if transparency is turned off.

After the state of the graphics processing unit is captured, the commands sent to the graphics processing unit for a frame are captured (act 104). The number of commands sent to the graphics processing unit in order for the unit to draw a single frame can vary, but can easily be in the hundreds if not thousands of commands. Additional information associated with these commands (e.g., the contents of memory referenced by the commands) may also be captured, as discussed in more detail below. A set of commands sent to the graphics processing unit is also referred to herein as a command stream or stream of commands.

The captured state of the graphics processing unit from act 102 and the captured set of commands from act 104 are saved (act 106). By saving the state of the GPU and the captured set of commands, at a later time the GPU can be set to the same state as when the set of commands were captured, and then selected ones of the commands can be submitted to the GPU, as discussed in more detail below.

Alternatively, rather than capturing the commands or in addition to capturing the commands, timing data may be captured in act 104 and saved in act 106. As discussed in more detail below, this timing data can identify, for example, an amount of time taken to draw the frame and/or amounts of time taken to draw different parts of the frame.

The set of captured commands can optionally be modified (act 108). This modification can be changing one or more of the commands in the set, adding one or more commands to the set, removing one or more commands from the set, and/or reordering one or more commands in the set. The specific way in which the modification is performed can vary based on the type of information to be ascertained. For example, the modification may involve analyzing the set of commands to identify redundant commands and then removing those redundant commands. Additional details regarding modifications to the set of captured commands are discussed below.

The GPU is then set to the state that was captured in act 102 (act 110). This setting can be performed by, for example, setting all of the registers, buffers, and/or other memory of the graphics processing unit in which variables or settings are stored to the same settings as were captured in act 102.

Once the GPU is set to the captured state, at least a subset of the set of commands captured in act 104 are sent to the GPU (act 112). These commands sent to the GPU in act 112 may optionally include the set of commands as modified in act 108. For example, if there are commands to draw the terrain in a frame and commands to draw characters in the frame, only the commands to draw the terrain may be sent to the GPU in act 112 to allow the user to see how the terrain was drawn without the characters being present. By way of another example, if the set of commands is modified in act 108 to remove the redundant commands, then the modified set of commands (having the redundant commands removed) may be sent to the GPU in act 112.

After the commands are sent to the GPU in act 112, feedback is returned based on the commands sent in act 112 (act 114). This feedback can take a variety of different forms. For example, the feedback may be the frame drawn given the commands sent to the GPU in act 112. By way of another example, the feedback may be an indication of how long it took the GPU to draw the frame given the commands sent to the GPU in act 112. The feedback may also take other forms, as discussed in additional detail below.

Figure 2:
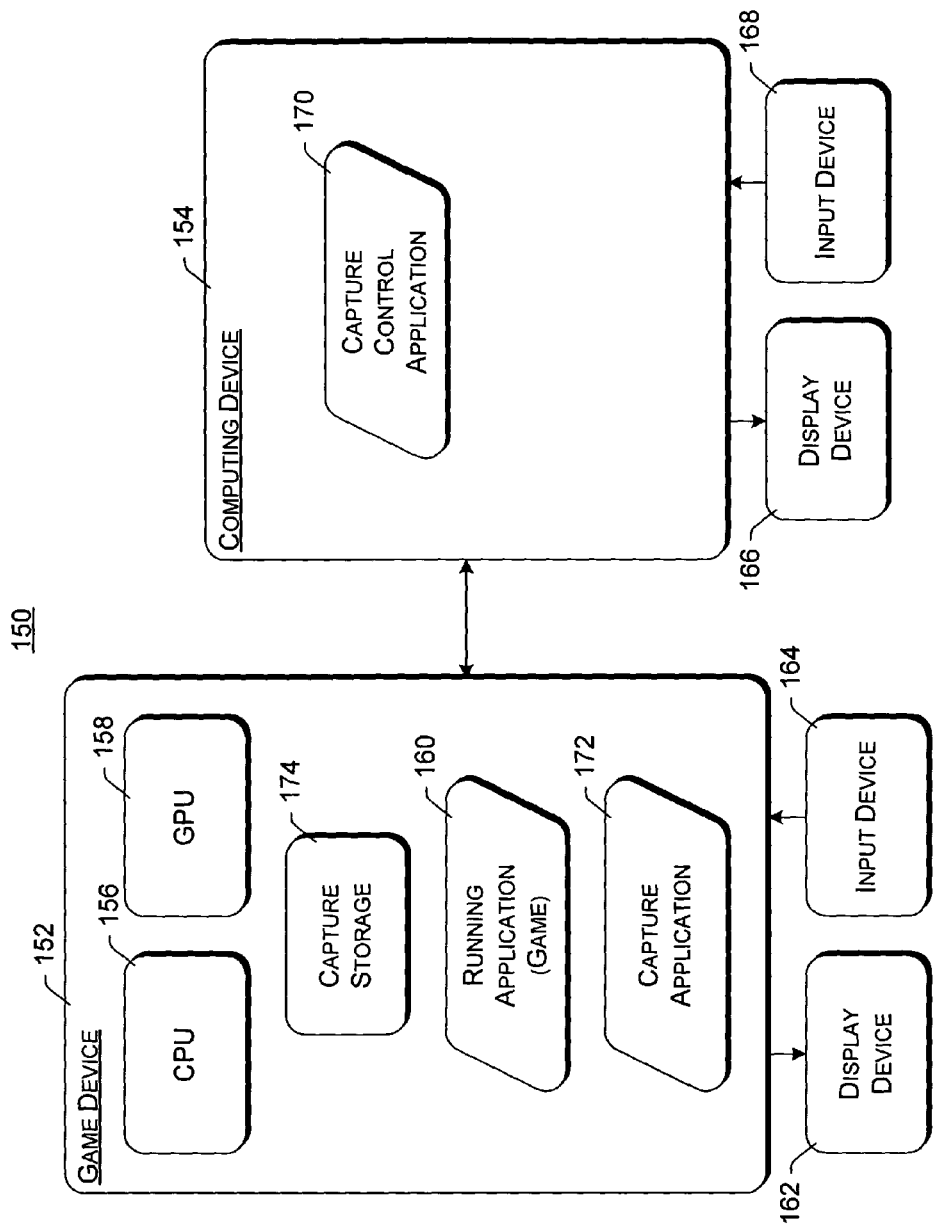
FIG. 2 is a block diagram illustrating an example system for capturing commands sent to a graphics processing unit.

FIG. 2 is a block diagram illustrating an example system 150 for capturing commands sent to a graphics processing unit. System 150 includes a game device 152 and a computing device 154. Game device 152 represents any of a wide variety of game devices, such as stand-alone gaming consoles, handheld gaming devices (e.g., with built-in display devices), cellular telephones, desktop PCs, notebook or handheld PCs, and so forth.

Game device 152 includes a central processing unit (CPU) 156 and a graphics processing unit (GPU) 158. CPU 156 runs a game or other application 160, and during running of the game 160 various commands are presented to GPU 158 in order to generate the video data for display by the game. Any of a variety of conventional CPUs and GPUs can be used as CPU 156 and GPU 158, respectively. GPU 158 processes the commands it receives and outputs its results into a memory commonly referred to as a frame buffer. Once GPU 158 has processed all of the commands it has received and output its results to the frame buffer, the display device can display the frame using the contents of the frame buffer. In certain embodiments, the frame buffer is a bit map that identifies, for each pixel of the display device, what color is to be displayed for that pixel. The processing of the commands and outputting of results into the frame buffer by GPU 158 is also referred to as GPU 158 drawing the frame.

The video is displayed on one or more display devices 162, and the user can control the game through one or more input devices 164. Display device 162 is intended to represent any device on which video can be displayed. Display device 162 can be, for example, a television (e.g., cathode-ray tube (CRT), plasma, projection, etc.), a computer monitor (e.g., CRT, plasma, LCD, etc.), a display device built into the same housing as game device 152 (e.g., a plasma display, LCD display, etc.), and so forth. Input device 164 is intended to represent any device which can input data to the game device 152. Input device 164 can be, for example, a handheld controller (e.g., having a joystick(s), button(s), and/or triggers), a mouse or other cursor control device, a steering wheel and pedals, a keyboard, a microphone, and so forth. Input device 164 can be external to game device 152, or alternatively may be included as part of game device 152.

Computing device 154 is a remote device to game device 152. Computing device 154 may be located close to game device 152 (e.g., on the same desk or in the same room), or alternatively may be located further away from game device 152 (e.g., in another part of the building, or across the Internet). Computing device 154 represents any of a variety of computing devices (e.g., a desktop PC, workstation, portable or notebook computer, etc.). Computing device 154 similarly is coupled to (and/or includes) one or more display devices 166 and one or more input devices 168. Display device 166 can be any device on which video can be displayed, analogous to display device 162. Input device 168 can be any device which can input data to computing device 154, analogous to input device 164.

Computing device 154 includes a capture control application 170 that is executed by one or more processors (not shown) of computing device 154. Capture control application 170 displays, on display device 166, a user interface that allows a user (e.g., a game designer or tester) to request that frames of video be captured and/or to present feedback (e.g., from act 114 of FIG. 1) to the user by way of display device 166.

When a user, such as a game designer or tester, desires to capture a frame of video data, he or she indicates to capture application 172 to begin capturing a frame of video data. Capture application 172 can be invoked to begin capturing a frame of video data in a variety of different manners. In certain embodiments, a command is entered by the user to capture control application 170 by way of input device 168 (e.g., a keyboard sequence may be entered, a "capture" button or menu option displayed in the user interface provided by application 170 may be selected, a verbal command may be input, and so forth). When such a command is received by application 170, application 170 sends a request to capture application 172 for capture application 172 to begin capturing a video frame. In other embodiments, the command may be entered by the user to capture application 172 by way of input device 164 (e.g., a keyboard sequence may be entered, a sequence of buttons, triggers, and/or joystick positions on a game controller may be entered, a verbal command may be input, and so forth).

The game designer or tester may desire to capture frames of video data at different times for a variety of different reasons. For example, the designer or tester may simply desire to randomly capture video frames while playing the game in order to analyze the frames and verify they are being drawn as desired. By way of another example, the designer or tester may play the game and, whenever he or she perceives that the game is running slower than he or she believes it should, then he or she can have a video frame selected at this "slow" spot. This allows, for example, the designer or tester to analyze a frame in a "slow" spot of the game in order to ascertain whether the frame is being drawn as fast as it should be, and if not why not.

When capture application 172 receives the command to begin capturing a video frame, application 172 waits for drawing of the current frame to finish, then captures the state of GPU 158 and saves that state in capture storage 174. Capture storage 174 can be any of a variety of storage devices (e.g., volatile or nonvolatile memory such as RAM or Flash memory, a magnetic or optical disk, etc.). Although illustrated as being part of game device 152, capture storage may be located entirely or partially elsewhere. For example, capture storage 174 may be distributed across multiple storage devices, or may be located entirely on a storage device in another location. Other locations where capture storage 174 may be located include an input device 164, computing device 154, input device 168, and so forth.

After capturing the state of GPU 158, capture application 172 proceeds to capture all commands that are sent to GPU 158 for the frame and stores the captured commands in capture storage 174. Capturing the commands sent to GPU 158 is a process in which running application 160, which sends commands to GPU 158, is interrupted each time it sends a command and the command is copied into capture storage 174. When the command has been copied, running application 160 continues to execute and submits its next command to GPU 158. After all of the commands for the frame have been sent to GPU 158, capture application 172 stops capturing the commands. Capture application 172 then waits until it again receives a command to capture a frame before proceeding to capture any additional frames.

Although described herein as typically capturing only one frame at a time, alternatively multiple frames may be captured by capture application 172 when it receives a command to capture a frame. Capture application 172 may be pre-configured or pre-programmed with a number of frames it will capture when it receives a command to capture a frame, capture application 172 may have a default number of frames it will capture, the user that initiates the command to capture a frame may supply as part of the command the number of frames to be captured, and so forth. For example, capture application 172 may capture two, three, four, or more consecutive frames in response to such a command. By way of another example, capture application 172 may capture one frame, then capture a second frame some amount of time afterwards (e.g., the second frame may be the $45^{th}$ frame after the command is received). By way of yet another example, a user may specify when the capture is to begin and then frames are captured until the user specifies that the capture should end. In this situation, a variable number of frames would be captured.

Capture application 172 can capture timing data regarding commands submitted to GPU 158 and/or the commands submitted to GPU 158. When timing data and the commands are both captured, care should be taken that the time involved in capturing of commands is not reflected in the captured timing data. This situation can be resolved in different manners. In certain embodiments, either the timing data or the commands are captured, and then the game 160 is informed that it should repeat the frame. The game repeats preparing that frame at which time the other of the timing data and commands are captured. In alternate embodiments, the commands are captured and then timing data is obtained subsequently as part of the analysis process (e.g., in acts 112 and 114 of FIG. 1).

The way in which the state of the GPU 158 and the commands sent to the GPU 158 (or timing data) are captured can vary. The state of the GPU 158 and commands sent to the GPU 158 may be captured in different manners due to design choices as well as due to differences in the architecture of GPU 158 and/or game device 152.

In certain embodiments, game device 152 includes a Direct3D® (D3D) Application Programming Interface DLL (dynamic link library) which is a library of graphics functions that can be invoked by game 160. Capture application 172 can optionally be incorporated into the D3D library.

Table I illustrates an example list of CPU events for which timing data can 4 be captured, as well as whether there is a GPU event that corresponds to the CPU event. These events refer to calls to API (application programming interface) 6 functions or procedures. The time when the call to the API is made, as well as when the called function or procedure ends, is recorded as part of the timing data.

TABLE I

| CPU Event | API | GPU Event |
|---|---|---|
| Clear | Clear | Yes |
| DrawVertices | DrawVertices, DrawPrimitive | Yes |
| DrawVerticesUP | DrawVerticesUP, DrawPrimitiveUP | Yes |
| DrawIndexedVertices | DrawIndexedVertices, DrawIndexedPrimitive | Yes |
| DrawIndexedVerticesUP | DrawIndexedVerticesUP, DrawIndexedPrimitiveUP | Yes |
| CopyRects | CopyRects | Yes |
| BeginPush/EndPush | BeginPush/EndPush | Yes |
| RunPushBuffer | RunPushBuffer | Yes |
| Begin/End (Vertices) | Begin/End | Yes |
| Swap | Swap, Present | No |
| LockSurface | D3DSurface_LockRect | No |
| LockTexture | D3DTexture_LockRect | No |
| LockVertexBuffer | D3DVertexBuffer_Lock | No |
| LockPalette | D3DPalette_Lock | No |
| BlockOnObject | D3D block | No |
| BlockOnPushbuffer | D3D block | No |
| BlockOnFence | D3D block | No |
| BlockUntilIdle | D3D block | No |
| BlockOnSwap | D3D block | No |
| VBlank | None | No |
| VBlankSwap | None | No |
| VBlankMissed | None | No |
| PrimeVertexCache | PrimeVertexCache | Yes |
| DrawTri/RectPatch | DrawTri/RectPatch | Yes |

Capture application 172 can obtain the current state of GPU 158 in a variety of manners. In certain embodiments, capture application 172 submits one or more commands specific to GPU 158, in response to which GPU 158 returns its state (e.g., the current values of all of the registers, buffers, and/or other memory of GPU 158 in which variables or settings are stored). Other static information in GPU 158 may also be obtained as part of the capture, such as the instructions of programs used internally by GPU 158 (e.g., pixel shader or vertex shader programs used GPU 158). In other embodiments, the regions of memory in GPU 158 are accessible by memory address to capture application 172, and capture application 172 can read from these memory addresses.

Capture application 172 can capture commands sent to GPU 158 by monitoring the commands that are sent to GPU 158 (e.g., from the D3D DLL). Every time a command is sent from the D3D DLL library, application 172 captures the command and all of the parameters of the command. Additionally, some commands may have as parameters references to other memory locations. In these situations, application 172 obtains the data from the referenced memory location(s) and captures that data as well. Additionally, rather than always capturing the data at the referenced memory location, application 172 can check whether that memory location was previously referenced by another command already captured for this frame—if so, then application 172 can check whether the data previously obtained from that memory location is the same as the data currently obtained from that memory location, and if so then the data need not be captured again for this command. Such a check can be performed in different manners, such as by maintaining a record of memory locations accessed and their contents when accessed, by searching through the commands already captured, and so forth.

By obtaining data from other memory locations referenced in calls to GPU 158, the capture performed by application 172 is more robust. As a specific example, assume that texture mapping is being used to draw the surfaces of tree leaves in a frame. The texture mapping for the leaves is stored in the same memory location, but CPU 156 may modify that texture mapping for two different leaves in the frame. So, even though each command sent to GPU 158 references the same memory location, the texture mapping used for the two different leaves is different. Thus, in order to accurately capture the frame being drawn, the data at that memory location (the texture map) should be captured as well.

In certain embodiments, a capture opcode in the D3D DLL is used to indicate whether the next frame is to be captured. When a command to capture a frame is received by capture application 172, capture application 172 sets the capture opcode. The end of a frame is indicated by game 160 by use of a Present( ) or Swap( ) call. When a Present( ) or Swap( ) call is detected by the D3D DLL, the D3D DLL checks whether the capture opcode has been set. If the capture opcode has been set, then application 172 proceeds to begin capturing the next frame. Additionally, application 172 clears the capture opcode so that at the end of the frame being captured the capture opcode will not be set and another frame will not be captured.

Additionally, the game designer may design the game to specify certain information when the game is submitting commands to GPU 158. For example, the game designer may include information identifying what part of the frame is being drawn (e.g., the character's left arm, the character's right arm, the character's weapon, the background terrain, etc.). When such information is present, capture application 172 can capture this information and save it in capture storage 174. This captured information can then subsequently be used when feedback is presented to the user (e.g., in act 114 of FIG. 1). For example, a timeline may be presented to the user in act 114 of FIG. 1 showing when different parts of the frame were drawn, and the information identifying what part of the frame is being drawn at any particular time can be shown on the timeline.

In addition, stack trace information may also be captured by application 172. Stack trace information tells the user which software routines called a particular function (e.g., a D3D function) which resulted in a command being sent to GPU 158. Each time a function is called, the return address is placed on the stack. The stack trace is obtained by parsing back through the stack from the current stack pointer and retrieving these return addresses. Using this series of return addresses, capture application 172 examines the symbols for running application 160 and converts the addresses to symbols that are more informative to the user. For example, a fully resolved stack trace might look something like the following:

```
Main( )
    GameLoop( )
        Render( )
            DrawMainCharacter( )
                FirstPass( )
                    RightArm( )
                        DrawIndexedVertices( )
```

The last function listed in the stack trace, DrawIndexedVertices( ), is typically a function that resulted in a GPU command being passed to GPU 158. When a developer is analyzing data from a captured scene, the stack trace helps the developer to identify which drawing calls are which.

Figure 3:
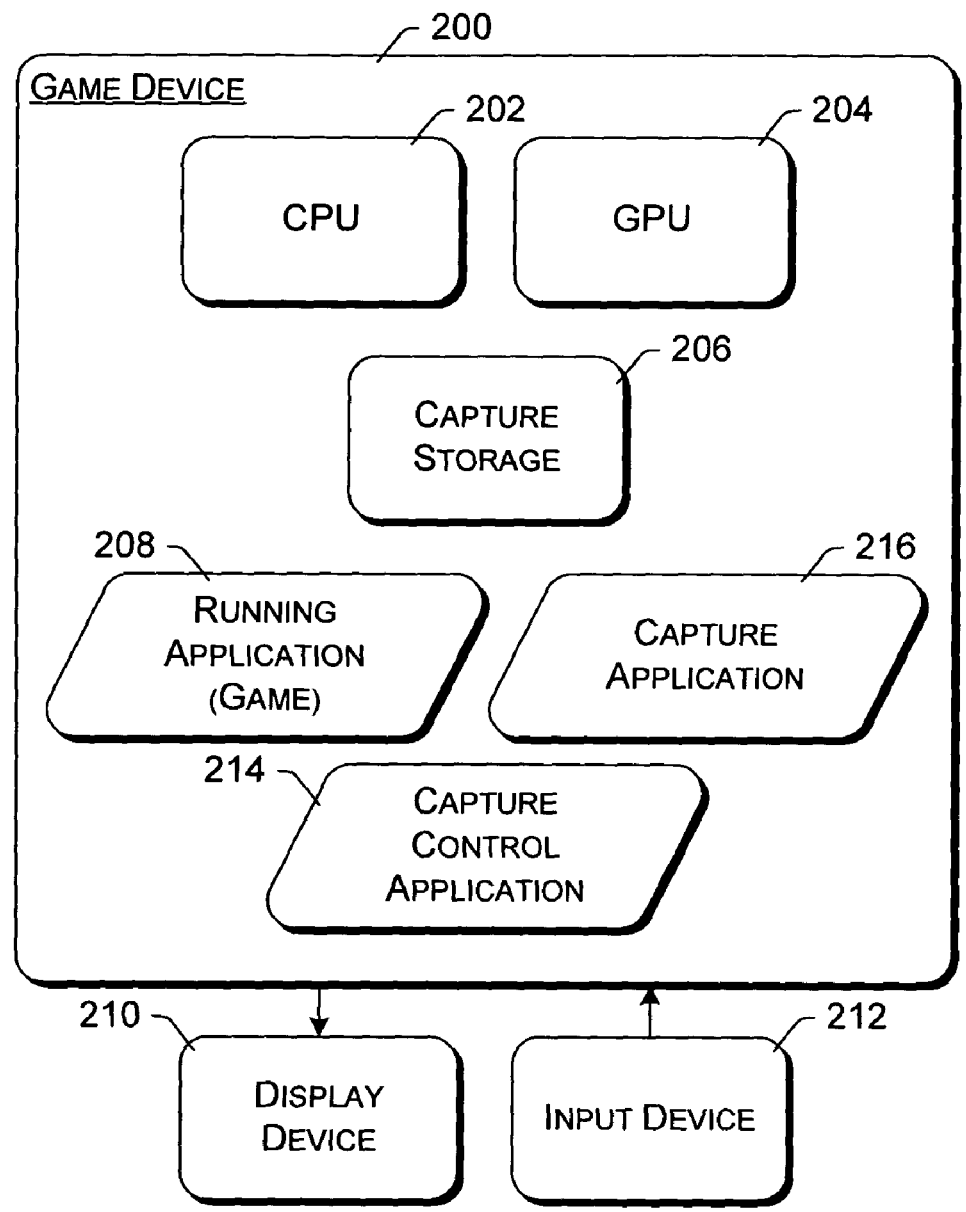
FIG. 3 is a block diagram illustrating another example system for capturing commands sent to a graphics processing unit.

FIG. 3 is a block diagram illustrating another example system 200 for capturing commands sent to a graphics processing unit. System 200 is similar to system 150 of FIG. 1, except that system 200 includes a single game device and no computing device.

Game device 200 includes a CPU 202 (analogous to CPU 156 of FIG. 2), a GPU 204 (analogous to GPU 158 of FIG. 2), capture storage 206 (analogous to capture storage 174 of FIG. 2), and game 208 (analogous to game 160 of FIG. 2). Game device 200 is coupled to (or includes) display device 210 (analogous to display device 162 or 166 of FIG. 2), and is also coupled to (or includes) input device 212 (analogous to input device 164 or 168 of FIG. 2).

Game device 200 also includes a capture control application 214 and a capture application 216. Capture control application 214 is similar to capture control application 170 of FIG. 2, and Capture application 216 is similar to capture application 172 of FIG. 2. However, applications 214 and 216 different from applications 170 and 172 in that applications 214 and 216 are part of the same game device 200. So, any commands or data sent between application 214 and capture application 216 are sent internal to game device 200 rather than between two devices. Additionally, capture control application 214 presents its user interface by way of display device 210.

Figure 4:
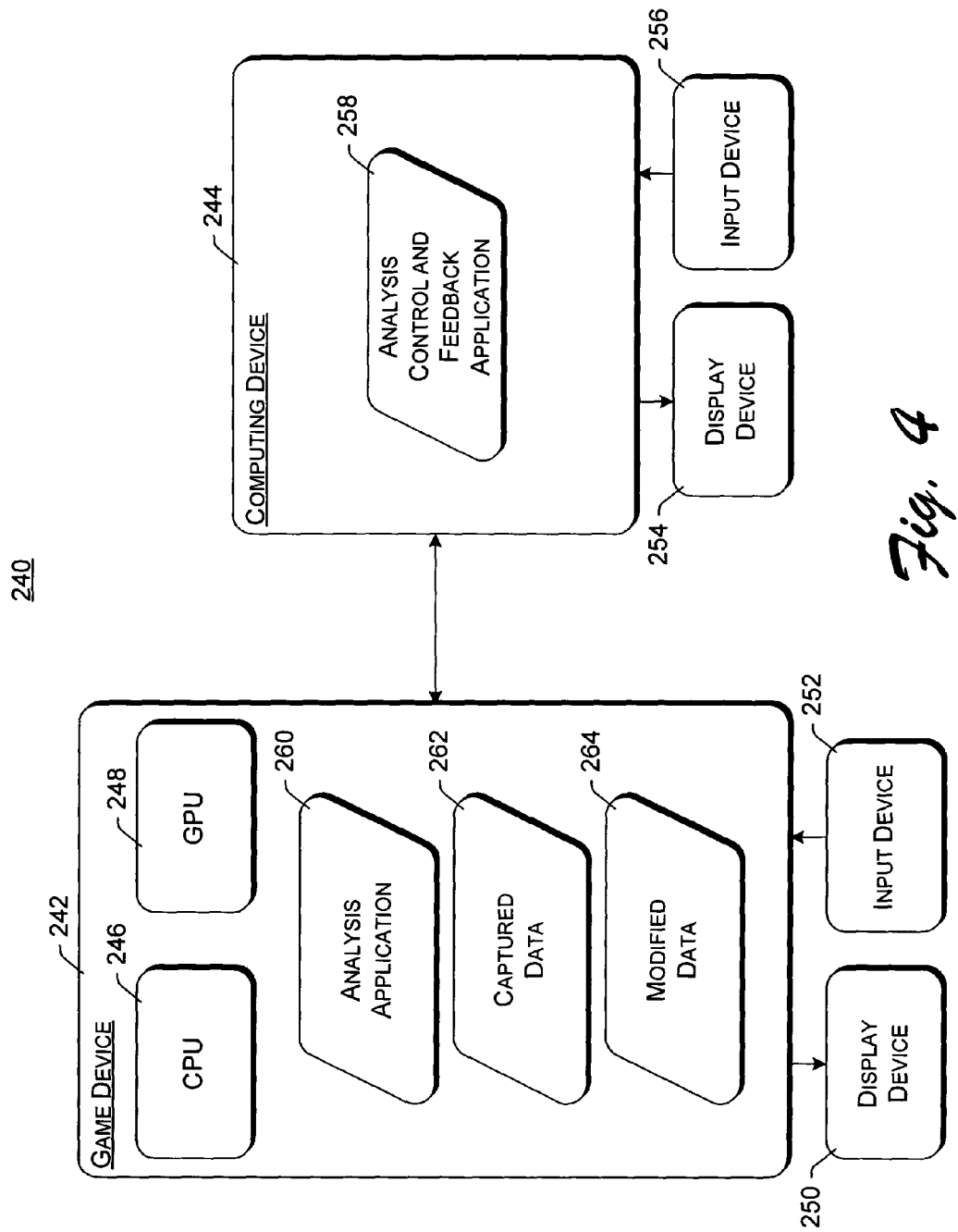
FIG. 4 is a block diagram illustrating an example system for playback and analysis of a frame(s) drawn by a graphics processing unit.

FIG. 4 is a block diagram illustrating an example system 240 for playback and analysis of a frame(s) drawn by a graphics processing unit. System 240 includes a game device 242 and a computing device 244. Game device 242 includes a CPU 246 (analogous to CPU 156 of FIG. 2) and a GPU 248 (analogous to GPU 158 of FIG. 2). Game device 242 is coupled to (or includes) display device 250 (analogous to display device 162 of FIG. 2), and is also coupled to (or includes) input device 252 (analogous to input device 164 of FIG. 2). Similarly, computing device 244 is coupled to (or includes) display device 254 (analogous to display device 166 of FIG. 2), and is also coupled to (or includes) input device 256 (analogous to input device 168 of FIG. 2).

Game device 242 is similar to game device 152 of FIG. 2, and in certain embodiments devices 242 and 152 are the same device (or at least the same type of device, such as both the same type of gaming console). The difference between game devices 242 and 152 is that game device 242 is running an application(s) to facilitate playback and analysis of a frame based on previously captured commands and GPU state (e.g., captured by capture application 172 of FIG. 2).

Computing device 244 includes an analysis control and feedback application 258. Application 258 provides a user interface, through display device 254. The user interface allows the user of device 244 to input, through input device 256, requests for analysis of a frame to be performed. These requests can also be referred to as questions regarding the frame. The user interface provided by application 258 also displays feedback regarding the frame to the user of device 244 (e.g., the feedback in act 114 of FIG. 1). The specific feedback provided to the user can vary based on the analysis performed, as discussed in more detail below.

Requests for analysis are sent from application 258 to analysis application 260. Analysis of a frame can begin immediately after the frame is captured, or alternatively at some later time. For example, when the designer or tester captures a frame, the analysis of the frame may begin right after the frame is captured, or alternatively multiple frames may be captured and the designer or tester (or some other user) may begin analysis of the captured frames at some later time.

Analysis application 260 receives the requests for analysis and sends the appropriate portions of captured data 262 to GPU 248. Feedback regarding the drawing of the data sent to GPU 248 is then returned by analysis application 260 to application 258 for presentation to the user on display device 254. Depending on the analysis requested, analysis application 260 may generate modified data 264 that is sent to GPU 248 in place of, or alternatively in addition to, captured data 262.

The captured data 262 is the same data for the frame as was captured and stored in the capture storage (e.g., storage 174 of FIG. 2). In certain embodiments, the captured data is maintained in the game device and referred to when requests are sent by application 258. In other embodiments, when analysis of a frame is to begin, the captured data is sent to game device 242 by application 258. In other embodiments, the portions of the captured data (and/or modified data) necessary for the analysis are sent by application 258 along with the request.

Additionally, although analysis application 260 is shown as being part of game device 242, portions of analysis application 260 may be implemented in computing device 244. For example, any required modifications to the data may be performed by computing device 244 rather than game device 242. Additionally, some analysis can be performed by computing device 244 without any help from game device 242. For example, the size of the captured data and the number of commands in the data can be determined by computing device 244 by parsing through the command stream.

When analysis of a frame is to begin, the state of GPU 248 is set to the previously captured state (e.g., as captured in act 102 of FIG. 1). The various memory location and register values that were captured as part of the state of the GPU (e.g., GPU 158 of FIG. 2) are written back to GPU 248. By writing these values back go the GPU, the GPU will be in the same state as it was at the beginning of the captured frame.

It should be noted that, during the analysis process, certain other memory locations in game device 242 may be accessed. For example, the memory location(s) for texture map(s) used in drawing the frame may be accessed. In such situations where other memory locations are accessed, analysis application 260 writes the appropriate data (as captured) to those memory locations prior to their being accessed by the captured commands.

One type of analysis that can be performed by analysis application 260 is timing analysis. Timing analysis refers to determining an amount of time a particular frame or portion of a frame takes to be drawn. Game device 242 has a clock (not shown) that can be used to determine an amount of time taken for a particular frame to be drawn. The commands for drawing the frame are sent to GPU 248 by analysis application 260, so application 260 can identify the current time of the clock when the first command is sent to GPU 248 (e.g., immediately prior to sending the first command to GPU 248). Application 260 also sends a command to GPU 248 to indicate that it has completed sending commands to GPU 248 (e.g., the Present( ) or Swap( ) commands discussed above). When GPU 248 has completed drawing the last command, GPU 248 returns an indication to the application sending the commands to GPU 248 (analysis application 260 in this instance) that the last command is completed. Application 260 can then identify the current time of the clock. By knowing the time when drawing of the frame began and the time when drawing of the frame was completed, the difference between these two times can be readily determined in order to identify the amount of time taken to draw the frame.

The amount of time taken to draw a portion of a frame can be determined in an analogous manner. By accessing the clock, the time when drawing of the portion begins and drawing of the portion is completed can be readily determined. These different portions can correspond to, for example, the events identified above in Table I.

The timing analysis can be used as a basis to provide various feedback to the user. The amount of time taken for a frame or portion of a frame to be drawn can be returned to the user. Additionally, other information can be ascertained based on the timing analysis and this other information can be returned to the user. This other information can be ascertained by analysis application 260 and/or analysis control and feedback application 258.

A wide variety of information can be ascertained based on this timing analysis. For example, which portions (e.g., objects) of the frame took the longest or shortest time to draw can be ascertained.

The timing analysis can also be performed based on modified data 264. This allows analysis application 260 to modify captured data 262 and then submit the modified data to GPU 248. The time taken to draw both the unmodified data and the modified data can be determined, and these two times used to determine how much the modification affected the time taken to draw the frame. For example, analysis application 260 may analyze captured data 262 to identify redundant commands. Redundant commands within the set of commands that is captured data 262 refers to duplicate commands that are present in the set of commands but one or more of these duplicate commands can be removed without altering the frame drawn by the set of commands. E.g., multiple commands to turn off transparency may be present in the set of commands, even though no other command in the set of commands operates to turn on transparency. Thus, all of the commands to turn off transparency after the first command to turn off transparency could be removed from the set of commands (the first command may also be removed if there is no previous command or state of the GPU 248 that would have caused transparency to be turned on).

It should be noted that some timing data for performing the timing analysis may be captured when the frame is captured, rather than being determined during the analysis process. For example, situations may arise where the amount of time taken by the CPU in the game device to determine particular values to be used in drawing the frame is very large. By capturing the timing data when the CPU is determining the particular values, rather than capturing the timing data based on the resultant captured values, situations where the GPU goes idle can be more easily detected. For example, the CPU can be so busy that it waits too long to issue a new command to the GPU which causes the GPU to go idle because it has nothing to work on. This is an important case for developers to be aware of because they typically endeavor to keep the GPU busy at all times. This information is lost when playing back a captured stream of commands because the commands are played back one-after-another without regard for any idle spots that may have been present when the application (e.g., game) originally ran.

Another type of analysis that can be performed by analysis application 260 is a partial frame draw. All of the commands in the captured data 262 are used to draw the entire frame. A partial frame draw can be performed by sending only a subset of the commands in the captured data 262 to GPU 248 and having GPU 248 draw the frame using only that subset (and thus less than all of the captured commands). For example, analysis application 260 may choose to send only the first five commands or the first ten commands, or all of the commands leading up to a particular command, etc. to GPU 248.

Whatever the subset of commands is, GPU 248 receives the subset and draws a frame given only that subset. Analysis application 260 can then return this frame to analysis control and feedback application 258 for display to the user on display device 254. Application 260 can send this frame in different manners, such as generating a bitmap representing the frame as drawn by GPU 248 and sending that bitmap to application 258. Drawing a partial frame can be useful to the developer as it allows the developer to see what the frame looks like after the first n drawing commands are completed (where the value of n can be set by the developer). Much like single-stepping a program, this allows the developer to see the scene being drawn step-by-step and to quickly determine which step drew something incorrectly.

Another type of analysis that can be performed by analysis application 260 is the determining of internal non-exposed state of GPU 248. Some state of the GPU 248 can be accessed by devices external to GPU 248 (e.g., the settings of certain variables, register values, etc.), and these states are captured as discussed above (e.g., in act 102 of FIG. 1). These states are typically states that affect all future drawing commands on GPU 248.

However, GPU 248 may also include additional internal state for which GPU 248 provides no mechanism for any component or module external to GPU 248 to access (e.g., no command can be sent to GPU 248 to read particular internal register values). Such states are typically transitory states. Transitory states can be thought of as similar to scratchpad memory, where the contents are only valid during a particular instruction of a particular invocation of the vertex or pixel shader program. When the next vertex or pixel is processed, this state is overwritten. Such transitory states are typically not easily retrievable because GPUs typically have no way to halt execution at a particular point so that these states can be read.

Some GPUs include internal programs that process some of the data received as commands. For example, one or more vertex shader programs and/or one or more pixel shader programs may be included in the GPU that operate on some of the data received by the GPU. As these programs within the GPU can make use of their own internal variables (e.g., registers and/or other memories), it may be useful to the designer or tester to know what the values of these registers and/or variables are as each pixel or vertex is processed. These registers and/or variables are often transitory states, such as the contents of a temporary register after a particular instruction has executed in a pixel shader program of GPU 248 that is a particular pixel in a particular drawing operation in the scene (e.g., the tmp( ) register contents after instruction 3 has executed in the pixel shader program that is processing pixel 238,242 in the $7^{th}$ drawing operation in the scene). By modifying the captured commands, and possibly internal programs for the GPU, additional information can be obtained.

Such modifications to identify settings of internal registers and/or other variables is illustrated by the following example. Assume that a pixel shader program used by the GPU is as follows (where t0, t1, and r0 are internal GPU registers):

tex t0 // load the result of texture stage t0 into register t0
tex t1 // load the result of texture stage t1 into register t1
add r0, t0, c0 // r0=t0+c0
mul r0, r0, t1 // r0=r0*t1
// r0 is the result written to the frame buffer Analysis application 260 can determine the internal value of the register $r_0$ in the third instruction as follows. The shader programmer is modified to be as follows:

tex t0 // load the result of texture stage t0 into register t0
tex t1 // load the result of texture stage t1 into register t1
add r0, t0, c0 // r0=t0+c0
// r0 is the result written to the frame buffer Notice that the last instruction which loaded register r0 with the value r0*t1 was removed. At the end of the shader program, r0 will contain the value of t0+c0 and that will be the result value that will be written to the frame buffer for that pixel. The modified command stream is fed to the GPU and the value for the pixel being tested is read from the frame buffer and can be returned to application 258 for presentation to the user. This value is the value of the r0 register in the third instruction.

The program can be modified again as follows:

tex t0 // load the result of texture stage t0 into register t0
tex t1 // load the result of texture stage t1 into register t1
mov r0, t1 //r0=t1
// r0 is the result written to the frame buffer Now, the value written by the GPU to the frame buffer will be the value of the t1 register in the second instruction. This process can be followed repeatedly to extract the values of all the internal registers.

In certain embodiments, analysis control and feedback application 258 has multiple default requests or questions that it submits to analysis application 260. These default requests or questions are pre-programmed into application 258. Additionally, the user of computing device 244 may also request information that involves one or more additional requests or questions be sent to analysis application 260.

In certain embodiments, analysis application 260 and/or analysis control and feedback application 258 analyze the requests sent to analysis application 260 and generate warnings for the user regarding rules or recommendations that were violated by the frame. For example, each different type of GPU typically has its own recommended programming practices. Tests to determine whether these programming practices were violated can be programmed in to application 258 or 260, so that each time a frame is analyzed these tests can be performed to determine whether the recommendations for programming the GPU were violated. A variety of such recommendations may exist, such as not setting certain register values if certain GPU functionality is not being used in a frame, issuing certain commands in certain orders, having the frame buffer and depth buffer both in tiled memory, not clearing the screen multiple times (e.g., clearing the screen after it has already been cleared), not submitting redundant commands, and so forth. Additionally, warnings can be given different priorities. For example, the warnings can be ranked according to how much time adhering to their associated recommendations would save for this frame. By way of another example, particular warnings may be presented only if they satisfy certain constraints (e.g., display a warning to the user only if not violating the recommendation would have allowed the frame to be drawn a threshold amount faster).

Analysis of the frame can continue until analysis application 260 is informed to stop analyzing the frame. The user, for example, can select a "stop" or "cancel" option on the user interface presented by application 258 to stop analyzing the frame.

It should be noted that all of the analysis of the set of commands, whether captured commands or modified commands are sent to GPU 248, is based on the commands being performed by the same GPU as will be running the game. As the actual GPU can be used, an emulator or simulator need not be used. By using the actual GPU, the accuracy of the analysis is improved due to any approximations or errors that may be introduced by an emulator or simulator. Additionally, any timing measurements obtained by an emulator or simulator would have little, if any, meaning.

Figure 5:
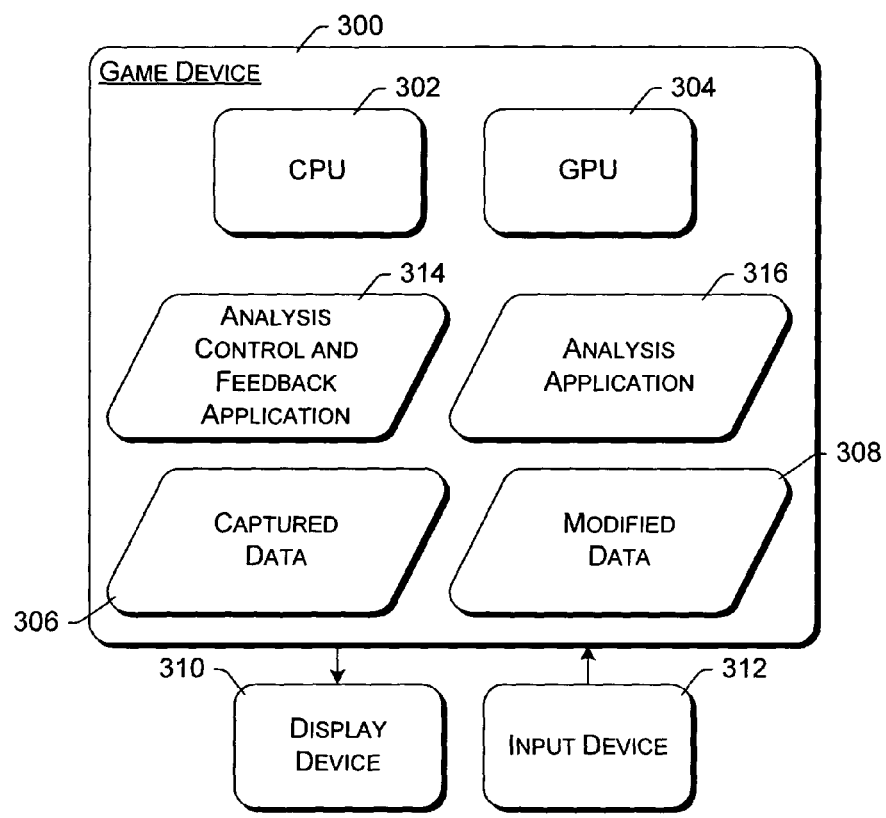
FIG. 5 is a block diagram illustrating another example system for playback and analysis of a frame(s) drawn by a graphics processing unit.

FIG. 5 is a block diagram illustrating another example system 300 for playback and analysis of a frame(s) drawn by a graphics processing unit. System 300 is similar to system 240 of FIG. 4, except that system 300 includes a single game device and no computing device.

Game device 300 includes a CPU 302 (analogous to CPU 246 of FIG. 4), a GPU 304 (analogous to GPU 248 of FIG. 4), captured data 306 (analogous to captured data 262 of FIG. 4), and modified data 308 (analogous to modified data 264 of FIG. 4). Game device 300 is coupled to (or includes) display device 310 (analogous to display device 250 or 254 of FIG. 4), and is also coupled to (or includes) input device 312 (analogous to input device 252 or 256 of FIG. 4).

Game device 300 also includes an analysis control and feedback application 314 and an analysis application 316. Analysis control and feedback application 314 is similar to analysis control and feedback application 258 of FIG. 4, and analysis application 316 is similar to analysis application 260 of FIG. 4. However, applications 314 and 316 different from applications 260 and 258 in that applications 314 and 316 are part of the same game device 300. So, any commands or data sent between application 314 and application 316 are sent internal to game device 300 rather than between two devices. Additionally, analysis control and feedback application 314 presents its user interface by way of display device 310.

Figure 6:
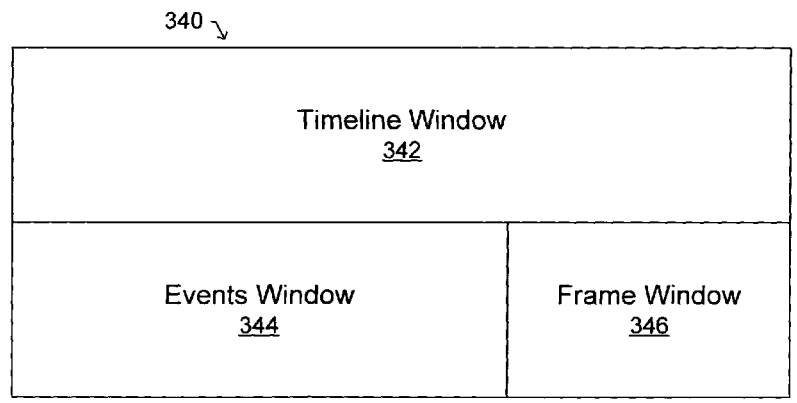
FIG. 6 illustrates an example user interface that may be displayed.

The analysis control and feedback application (e.g., application 258 of FIG. 4 or application 314 of FIG. 5) can present feedback to the user using any of a variety of user interfaces, including graphical user interfaces. FIG. 6 illustrates an example user interface that may be presented by the analysis control and feedback application. In the example of FIG. 6, the user interface display 340 includes a timeline window 342, an events window 344, and a frame window 346.

Timeline window 342 displays the captured timing information graphically using a timeline. This captured timing information can include, for example, when particular CPU or GPU events occurred.

Events window 344 contains a listing or grid of all of the events that have been captured along with all of the data regarding the frame that has been calculated as part of the analysis of the frame (e.g., by analysis application 260 of FIG. 4 or analysis application 316 of FIG. 5).

Frame window 346 displays information regarding the display of the frame, and may include images showing how the frame appears at different points during its being drawn. Windows 342, 344, and 346 are discussed in additional detail below.

It should be noted that although all three windows 342, 344, and 346 are illustrated in FIG. 6, alternatively only one or more of the windows may be displayed. For example, user interface display 340 may display only window 342, only window 344, only window 346, windows 342 and 344 but not window 346, windows 344 and 346 but not window 342, or windows 342 and 346 but not window 344.

Windows 342, 344, and 346 are illustrated in FIG. 6 with particular positions relative to one another. Alternatively, one or more of windows 342, 344, and 346 may be positioned elsewhere. Additionally, windows 342, 344, and 346 are illustrated in FIG. 6 as being adjacent to one another. Alternatively, one or more of windows 342, 344, and 346 may be positioned away from (not adjacent to) one or more of the other windows 342, 344, and 346.

Figure 7:
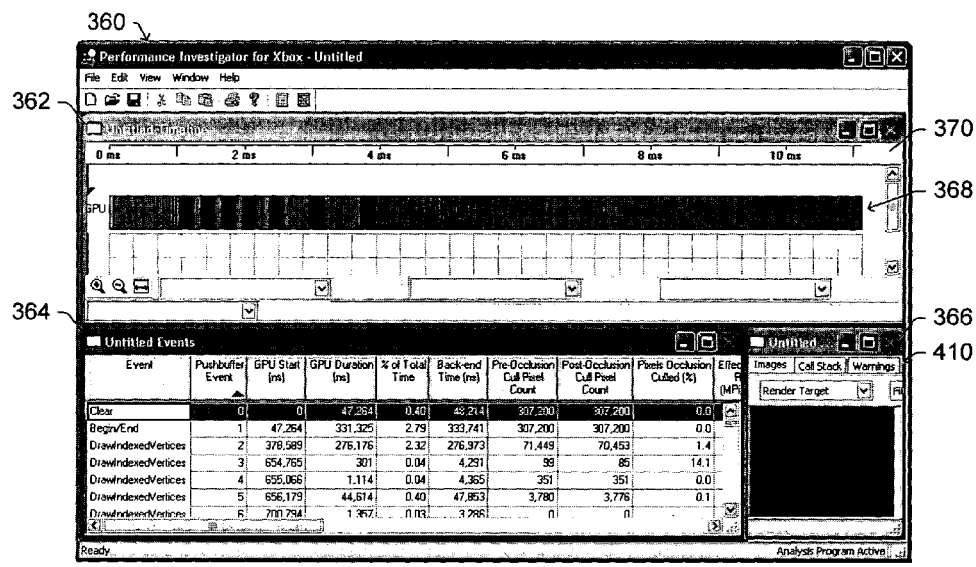
FIG. 7 illustrates another example user interface that may be displayed.

FIG. 7 illustrates another example user interface 360 that may be presented by the analysis control and feedback application. User interface 360 illustrates a more detailed version of user interface 340 of FIG. 6. User interface 360 includes a timeline window 362, an events window 364, and a frame window 366. Timeline window 362 includes a timeline 368 and an associated time scale 370. Time scale 370 refers to the drawing of a single frame (e.g., 0 ms refers to the beginning of the drawing of the frame). A time cursor may also be displayed in timeline window 362, the time cursor identifying a currently selected event on timeline 368. Timeline 368 includes multiple horizontal bars, each bar corresponding to a particular event in the drawing of the frame. Given the location of a particular bar and time scale 370, the time during drawing of the frame at which the event occurred can be determined by the user. Additionally, the width of each horizontal bar signifies how long it took for the event to be drawn.

An event as discussed herein can be different things in different embodiments. For example, in certain embodiments there may be particular commands that constitute events, such as those listed in Table I above. In other embodiments, every command submitted to the graphics processing unit may be an event. In other embodiments, the events may be identified by the game designer. For example, as discussed above the game designer may design a game to specify certain information when the game is submitting commands to the graphics processing unit (e.g., identifying what part of the frame is being drawn, such as the character's left arm, the character's right arm, the character's weapon, the background terrain, etc.). Such information can be used as events (e.g., each part of the frame being drawn can be a separate event).

Timeline window 362 displays the events that are listed in events window 364. These events can be hierarchical in nature. For example, a MainCharacter event may contain other events (referred to as children events) for DrawLeftArm, DrawHead, DrawWeapon, and so forth. When one event contains other events, it is displayed with a small plus sign next to it in events window 364. When the plus sign is clicked, the event is expanded so that its children events are displayed. When this happens, the event display in timeline window 362 changes. The horizontal bar that represented the parent event is now replaced with one or more horizontal bars that represent the child events. These horizontal bars may be the same color as the parent event or a different color. the space covered by the children events on the timeline does not exceed the space covered by the parent event.

All of the bars in timeline 368 may be the same color, or different colors may be used to signify different events. For example, clear commands may be one color, draw commands may be another color, swap commands may be yet another color, and so forth.

Additionally, more specific information may be available to the user by moving a cursor (e.g., an arrow or other on-screen cursor) over a part of timeline 368. The cursor can be moved using any of a variety of devices, such as a mouse, game controller, keyboard, track pad, trackball, and so forth. When the cursor is stationary over an event for greater than a threshold amount of time (e.g., one or two seconds), more specific information can be displayed to the user. Alternatively, when the event is "selected" (such as by depressing a mouse button or game controller button when the cursor is over the event) the more specific information can be displayed to the user. This more specific information can take a variety of different forms, such as the specific start and end times for the event (e.g., in nanoseconds).

Figure 8:
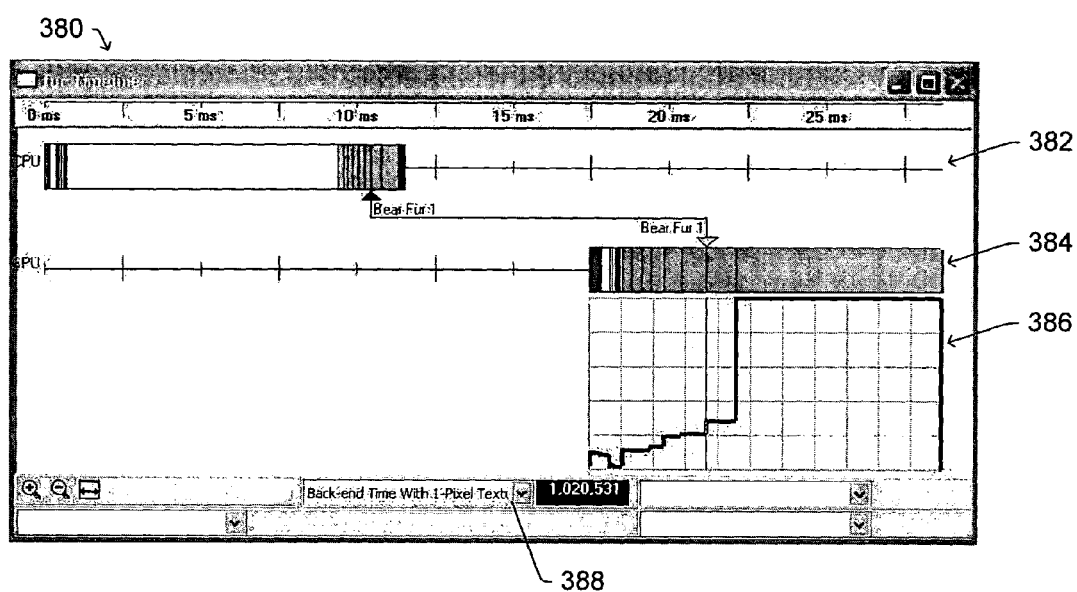
FIG. 8 illustrates an example timeline window which could be displayed as a timeline window of FIG. 7.

Timeline window 362 can include a timeline for the CPU, a timeline for the GPU, or timelines for both the CPU and the GPU. FIG. 8 illustrates an example timeline window 380 which could be displayed as timeline window 362 of FIG. 7. Timeline window 380 includes a CPU timeline 382 on which CPU events are displayed and a GPU timeline 384 on which GPU events are displayed. In many instances, a CPU event has a corresponding GPU event, and in such situations when either the CPU event or the GPU event is selected (e.g., by depressing a button on a cursor control device when the cursor is over the event, or moving a directional key (e.g., the + and − keys) of a keyboard), an arrow is displayed to link the CPU and GPU events.

When a CPU event is selected, the head of the arrow that points to the CPU event is solid and the head of the arrow that points to the corresponding GPU event is hollow. When a CPU event is selected, the arrow keys cause the CPU cursor to move linearly along CPU timeline 382. The down-arrow key moves the solid headed arrow down to the GPU event and subsequent arrow-key presses move the cursor linearly along GPU timeline 384. Pressing the up-arrow key moves the solid arrow head back up to CPU timeline 382 and the corresponding CPU event is selected. When a CPU event is selected, the other arrow points to the corresponding GPU event. Likewise, when a GPU event is selected, the other arrow points to the corresponding CPU event.

One or more graphs 386 may also be included in timeline window 380. Different information may be graphed, and in certain embodiments the user is able to select one of the columns from the events window (e.g., window 364 of FIG. 7, as discussed in more detail below). The data from the selected column is then plotted against time in graph 386. In the example graph 386, time is along the horizontal axis and the data from the selected column is along the vertical axis. Different columns can be selected from pull-down menu 388.

Returning to FIG. 7, events window 364 includes a table with a columnar listing of all of the events for the frame that have been captured along with all of the data regarding the frame that has been calculated as part of the analysis of the frame (e.g., by analysis application 260 of FIG. 4 or analysis application 316 of FIG. 5). Each row in the table represents an event. A CPU-only event will contain values in the CPU Start and CPU Duration columns. An event that also occurs on the GPU will have valid values in the GPU Start and Duration columns. If there is no timing information available, none of these four columns will have data. The remaining columns are calculated by the analysis application and will be empty if no analysis has been performed. FIG. 9 illustrates another example events window 400 with additional data.

The ordering of the events listed in events window 364 is ordinarily determined by the CPU Start Time column. Clicking on another column will cause the events to be listed in ascending order for that column. Clicking again on the header will cause the events to be listed in descending order for that column. An option is provided in the context menu (e.g., activated by right-clicking in the window) to restore the event sorting to its default value. Each column can be resized by dragging the edge of the column header with a cursor control device. The headers remain in place vertically as the events are scrolled up or down but they track the horizontal movement of the table as it is scrolled from side-to-side. Right clicking on the table or the columns brings up a context menu with additional options for resizing or other operations.

One example of such an operation is to export the entire table to a file that can be loaded into a spreadsheet or other program for further analysis. Another example of such an operation is to specify one or more columns that will be graphed in the timeline window along with the GPU event data (e.g., as graph 386 of FIG. 8). Another example of such an operation is display of a column chooser to assist the user in managing the display of the columns. User-selection of this operation causes a temporary window (not shown) to be displayed that will allow a set of columns and their order to be chosen. Columns that are not chosen will not be displayed in window 364. One or more predetermined column configurations for particular tasks (such as analyzing fill rate) may be presented to the user as part of the column chooser.

One or more rows of the table can be highlighted. The highlighted row(s) represent the event(s) which correspond to the event(s) that are represented by the currently selected horizontal bar of timeline 368. When a new horizontal bar(s) of timeline 368 is selected, then a new row(s) of the table is highlighted (the new row(s) representing the same event(s) as the newly selected horizontal bar(s)). Similarly, if a new row(s) of the table is selected and highlighted, then a new horizontal bar(s) of timeline 368 is selected (the new horizontal bar(s) representing the same event(s) as the newly selected row(s)).

The last row in the table is a summary row. The summary row contains calculated values based on all of the other events in the table. Each column has a summary type associated with it that is one of a maximum value, a minimum value, an average value, or a sum value. The summary value is calculated based on the summary type and the data in the column.

The events window will also support a hierarchical display of events. An application can specify user-defined events in a hierarchical way. When these events encompass other events, the user will have an option to display the user-event, the CPU and GPU events, and/or other hierarchical events that comprise it. For example, a game may specify a Start time for their physics engine and an end time. If no graphics events occurred during this time, the physics engine event will show up as a discrete CPU-only event in the events window. A game may also specify a start time for rendering the main character in the game and also an end time. In between these times are all the rendering calls for the main character. This event can be displayed in the events window with an expansion icon next to it. If the user clicks on this expansion icon, the events window will display all of the graphics events that occurred during the user event. When the user event is displayed, its columns will contain a summary of the information contained by the events under it in the hierarchy based on the summary type specified for each column.

By way of example, events window 400 of FIG. 9 shows a hierarchical event Bear Mesh 0 along with its children events (DrawIndexedVertices, KickPushBuffer, KickPushBuffer, DrawIndexedVertices, and DrawIndexedVertices). Other hierarchical events are also shown, such as Bear Mesh 1, although its expansion icon has not been selected so its children events are not displayed.

A variety of different columns can be included in events window 364. Table II lists examples of such columns. Reference is made in Table II, as well as elsewhere in this description, to the "push buffer" or "pushbuffer". The push buffer or pushbuffer refers to the commands and their associated data that are submitted to the graphics processing unit to be drawn. These commands and their associated data are captured, as discussed above.

TABLE II

| Column | Description |
| --- | --- |
| Back-end Time | Total back-end time that the rendering primitive took, as measured at the Z-cull stage of the graphics hardware pipeline. A hardware back-end flush is done between primitives to measure each primitive independently from one another. Because the flush eliminates overlaps in the pipeline between primitives, the sum of the back-end times may be more than the overall back-end render time. |
| Pre-Occlusion Cull Pixel Count | The number of pixels that would have been rendered if depth, stencil, and alpha comparison functions were ALWAYS. When multi-sampling, this is the post-multisample-expansion count. |
| Post-Occlusion Cull Pixel Count | The number of pixels that are actually rendered, taking into account depth, stencil, and alpha occlusion. When multi-sampling, this is the post-multisample-expansion count. |
| Pixels Occlusion Culled | Percent of pixels that are occlusion culled. |

TABLE II-continued

| Column | Description |
| --- | --- |
| Effective Fill Rate | Effective pixel fill rate, relative to the back-end time. |
| Ideal Fill Rate | Ideal pixel fill rate, relative to the back-end time. This is measured using all of the current state with the current render target, but using large quads that are rendered such that Z and stencil tests always pass, and with all textures forced to be opaque and 1 × 1 (or 1 × 1 × 1) texels in size. This is the fill-rate that could be achieved with the current primitive in the current state if the current Z compression was 100%, there was 100% utilization of the 4 pixel pipelines, and the texture reads had no performance impact. |
| Vertex Count | Vertex count. |
| Triangle Count | Triangle Count. |
| Effective Triangle Rate | Effective triangle fill rate, relative to the back-end time. |
| Vertex Shader Cost | Measured speed of the current vertex shader program (or fixed-function T&L), in GPU cycles. |
| Back-end Time With 1-Pixel Textures | The same measurement as the back-end time, but done with all textures set to opaque, 1 × 1 (or 1 × 1 × 1) texel size. |
| % Texture Bound | Measures how much of the rendered primitive time is attributable to texture fetches, as computed using the back-end times for 1 × 1 and normal sized textures. |
| Back-end Time With 0-Pixel Viewport | The same measurement as the back-end time, but done with the viewport forced to a zero-pixel size. |
| % Fill Bound | Measures how much of the rendered primitive time is attributable to fills, as computed using the back-end times for zero-pixel and normal sized viewports. |
| Z-Compressed Packets | The percentage of Z packets that are compressed after the primitive is rendered. Note that this is not the effective compression of the Z-buffer (after a Z clear, the percentage of Z-compressed packets will be 100%, but the effective compression is 87.5% due to 8-to-1 compression). |
| Push-buffer Inline Data | The number of bytes that are written into the push buffer to handle the command for the primitive rendering. For DrawIndexedVertices, this is effectively the amount of index data that has to be copied to the push buffer. |
| Push-buffer Setup Data | The number of bytes of state change commands in the push buffer that preceded the rendered primitive. |
| Push Buffer Event | Where the event occurs chronologically in drawing of the frame. |

Returning to FIG. 7, frame window 366 displays information regarding the display of the frame. This information regarding the frame may be a display of the frame as drawn, or different aspects of the frame (e.g., a depth buffer or wireframe view, shader programs used, warnings, and so forth as discussed below). Depending on the type of information being displayed, the information may be for the entire frame or the information may be displayed for different chronological points relative to the drawing of the frame. For example, if the information comprises warnings, then the information is for the entire frame. By way of another example, the information displayed in frame window 366 may show information regarding display of the frame as it appeared after being fully drawn, as it appeared after being only 25% drawn, as it appeared immediately after a particular event was finished being drawn, and so forth. Which chronological point is displayed in frame window 366 can vary based on which event in events window 364 is selected. Whenever an event in events window 364 is selected, frame window 366 displays information regarding display of the frame as it appeared immediately after the selected event was finished being drawn.

Figure 19:
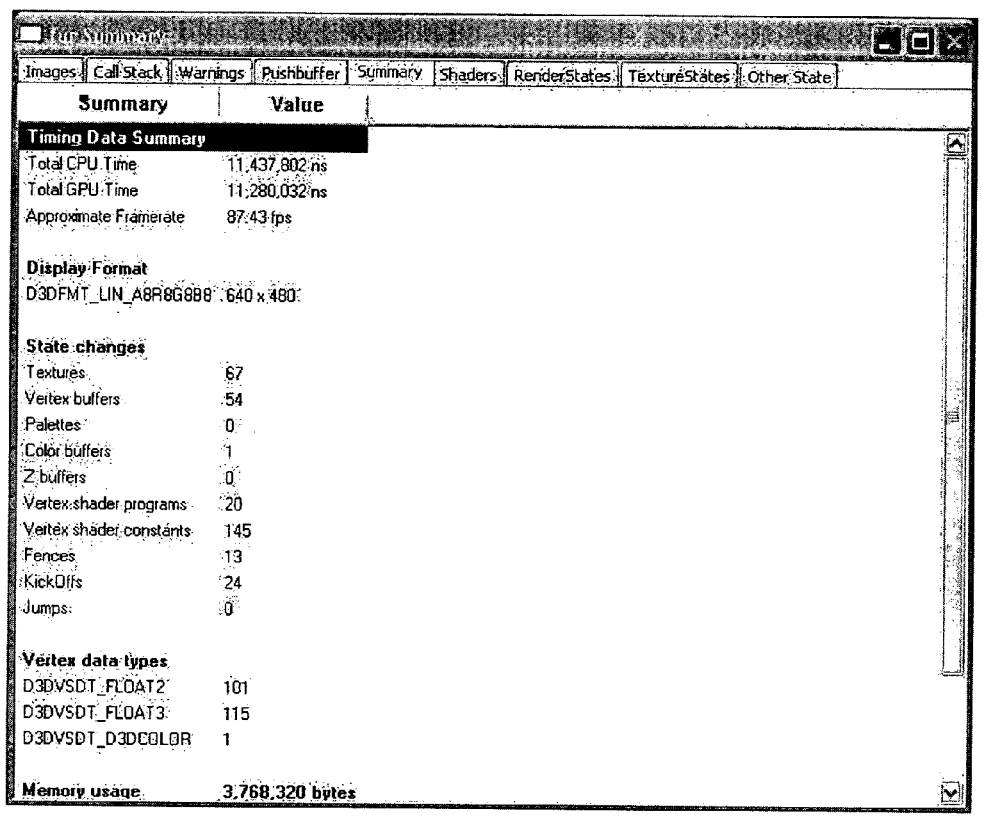
FIG. 19 illustrates an example of a summary window that can be displayed as a frame window of FIG. 7.
Figure 21:
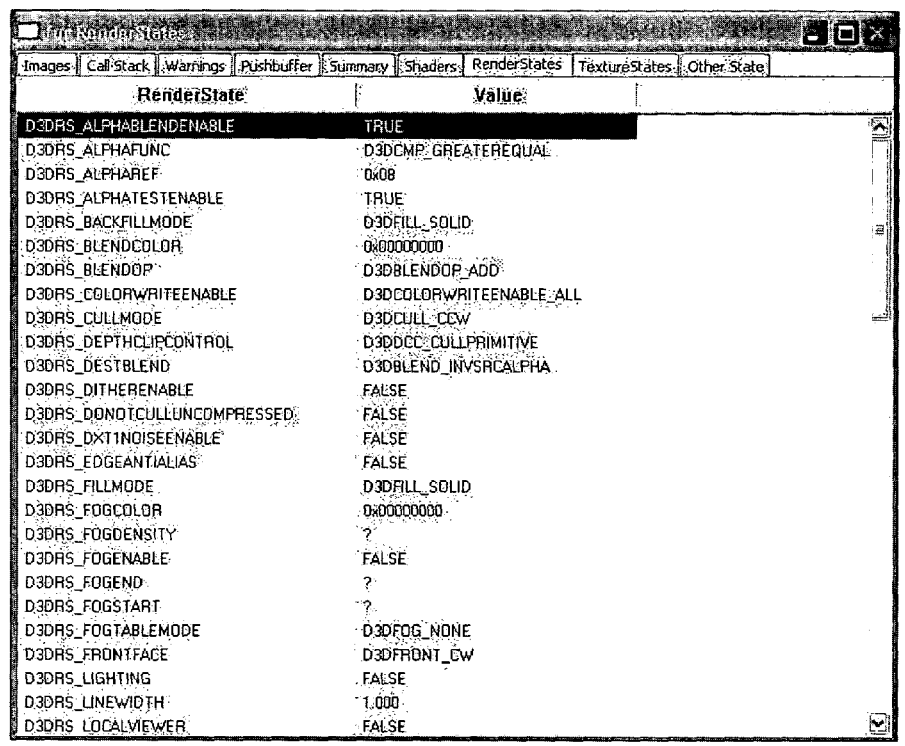
FIG. 21 illustrates an example of a renderstates window that can be displayed as a frame window of FIG. 7.
Figure 23:
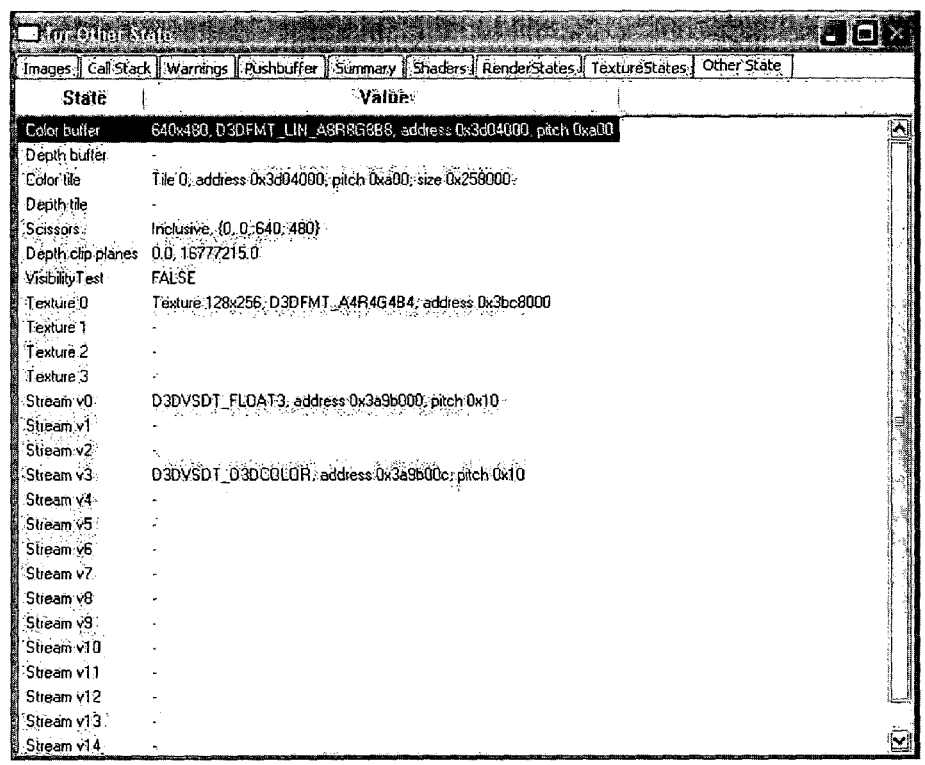
FIG. 23 illustrates an example of an otherstates window that can be displayed as a frame window of FIG. 7.

Different windows can be displayed as the frame window 366. Examples of such windows that can be displayed as the frame window 366 include an images window (examples of which are illustrated in FIGS. 10–15), a call stack window (an example of which is illustrated in FIG. 16), a warnings window (an example of which is illustrated in FIG. 17), a pushbuffer window (an example of which is illustrated in FIG. 18), a summary window (an example of which is illustrated in FIG. 19), a shaders window (an example of which is illustrated in FIG. 20), a renderstates window (an example of which is illustrated in FIG. 21), a texturestates window (an example of which is illustrated in FIG. 22), and an other state window (an example of which is illustrated in FIG. 23). Frame window 366 displays a set of tabs 410 which can be selected by the user to determine the window to be displayed as frame window 366.

Figure 10:
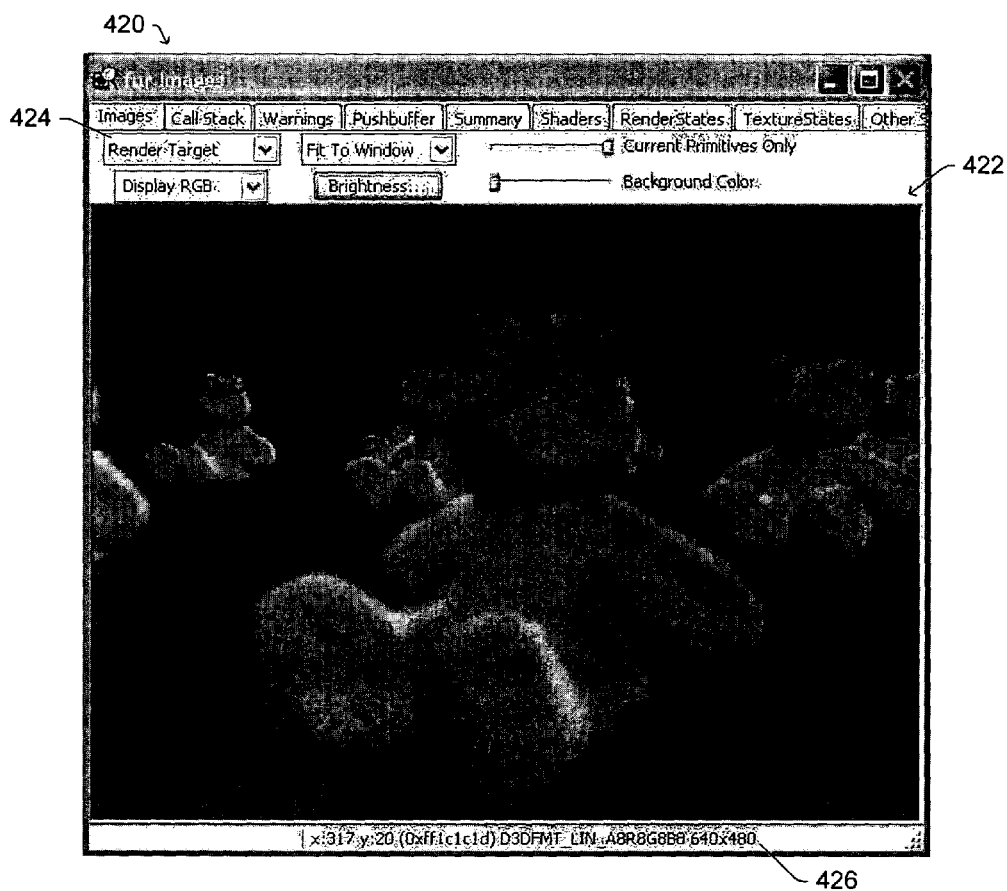
FIG. 10 illustrates an example of an images window that can be displayed as a frame window of FIG. 7.
Figure 11:
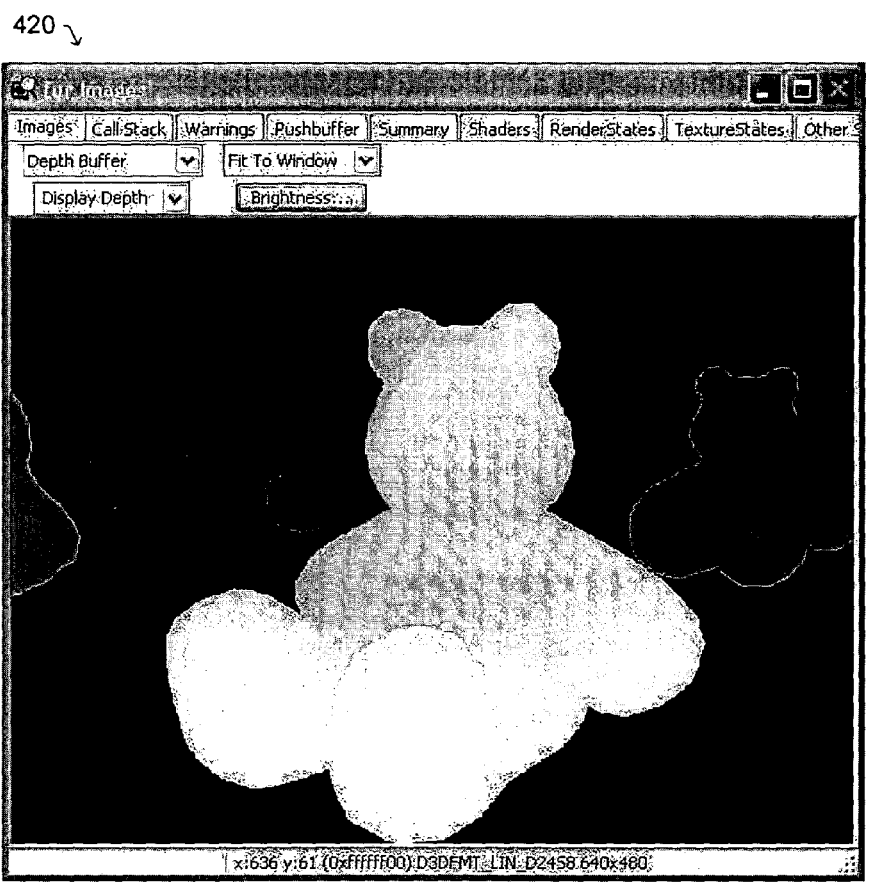
FIG. 11 illustrates an example of the depth buffer view of an images window.
Figure 12:
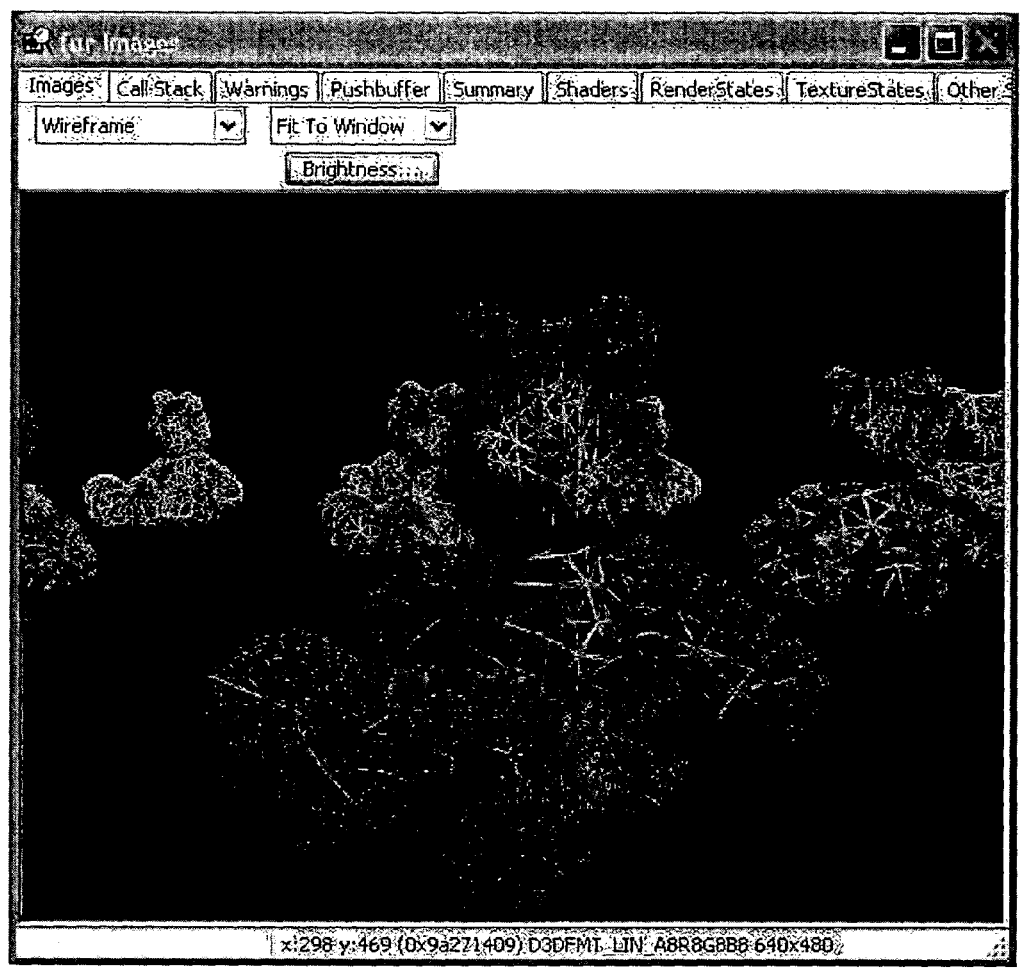
FIG. 12 illustrates an example of the wireframe view of an images window.
Figure 13:
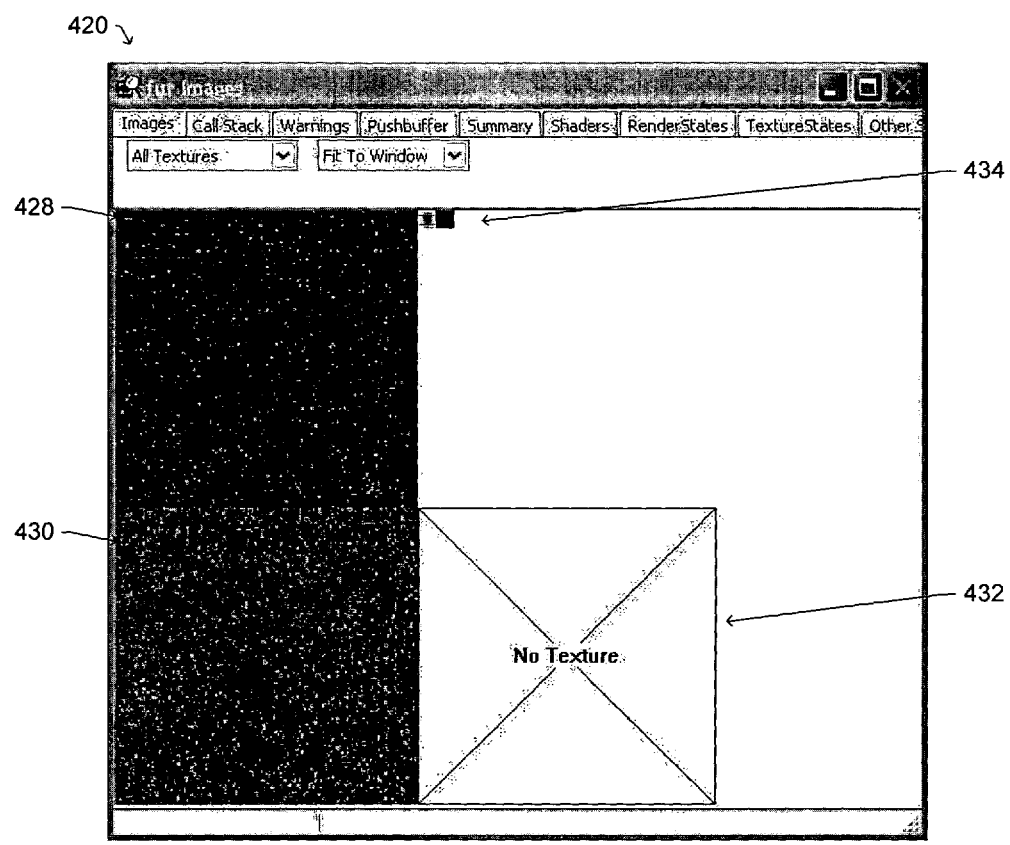
FIG. 13 illustrates an example of the texture view of an images window.
Figure 14:
FIG. 14 illustrates an example of the overdraw view of an images window.
Figure 15:
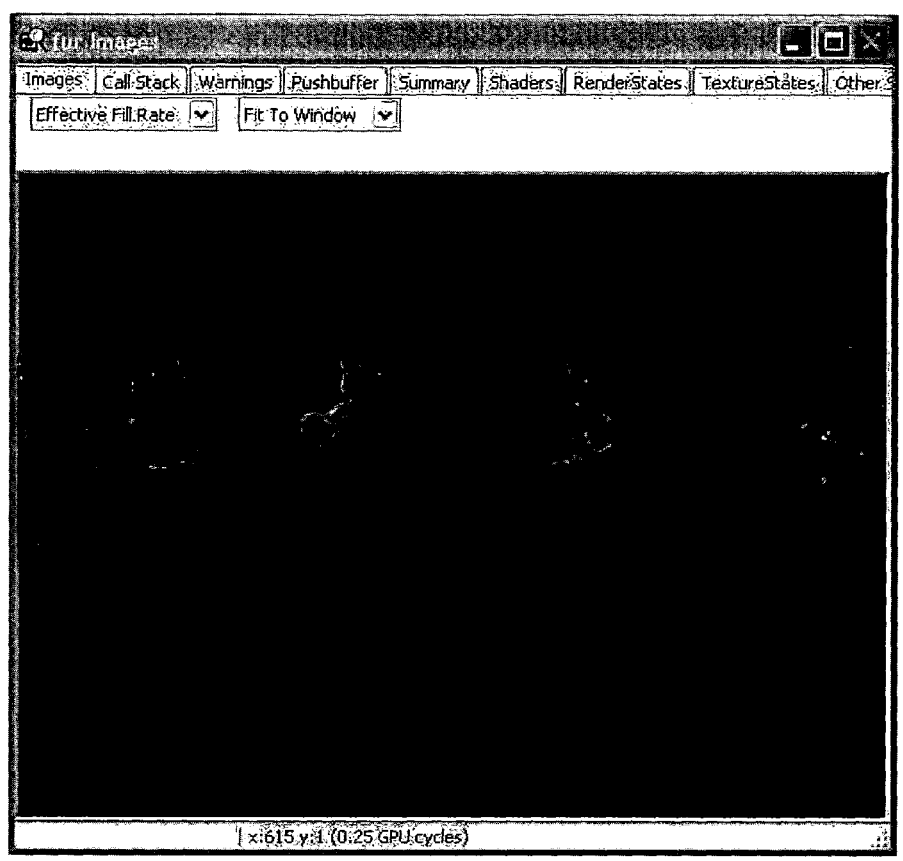
FIG. 15 illustrates an example of the fill rate view of an images window.

FIG. 10 illustrates an example of an images window 420 that can be displayed as frame window 366 of FIG. 7. The images window is used to display the many surfaces that are used by the game. Images window 420 of FIG. 7 illustrates a render target view 422. Different views for images window 420 can be selected from pull down menu 424. Examples of different views that can be selected for images window 420 include a render target view (an example of which is illustrated in FIG. 10), a depth buffer view (an example of which is illustrated in FIG. 11), a wireframe view (an example of which is illustrated in FIG. 12), a texture view (an example of which is illustrated in FIG. 13), an overdraw view (an example of which is illustrated in FIG. 14), and a fill rate view (an example of which is illustrated in FIG. 15).

The surfaces can be displayed within the images window 420 at various sizes (e.g., 100%, 200%, 400%, 50%, 25%, fit to window, etc.).

When the mouse is moved over a particular place on a surface displayed in the images window, the actual values at that pixel will be displayed in a status bar. An example status bar 426 is illustrated in FIG. 10.

For one or more of the views of the images window, such as the render target view, a particular pixel or group of pixels can be selected by the user. This selection can be made, for example, by the user moving a cursor over a pixel and activating the pointing device being used to control the cursor (e.g., clicking on the mouse button). By way of another example, a user could click and drag a rectangle to select a group of pixels. When such a pixel(s) is selected, all of the events in the events window (view 364 of FIG. 7) that render to that pixel will be highlighted.

The render target view 422 shows the color and alpha values held by the frame buffer. These values can correspond to the final image that is the frame, or alternatively may be some point during drawing of the frame. For example, as discussed above, only the commands for drawing a particular part of the scene may be submitted to the graphics processing unit, and the resultant frame can be displayed using the render target view.

In certain embodiments, the render target view 422 in conjunction with the timeline in timeline window 362 or the events in events window 364 can allow a user to "step through" the drawing of a frame event by event. For example, the user can select the first event (the first row) in the grid of window 364 and have the resultant view after only that first event is drawn by the graphics processing unit displayed as the render target view 422. The user can then select the second event (the second row) in the grid of window 364 and have the resultant view after both the first and second events are drawn by the graphics processing unit displayed as the render target view 422. This process can continue, allowing the user to slowly see how the frame is drawn and to easily identify any drawing problems associated with each event.

FIG. 11 illustrates an example of the depth buffer view of images window 420. The depth buffer view shows the depth buffer associated with the render target. This buffer holds depth values for each rendered pixel. The depth values are displayed in the window with the closest pixels colored white and the farthest pixels colored black with the rest of the pixels some shade in between based on their depth. Alternatively, other color schemes can be used.

FIG. 12 illustrates an example of the wireframe view of images window 420. The wireframe view shows the outline of each triangle rendered in the frame. The outline is shown in the same color as the outside border of pixels in the triangle. This view allows a user to see how many triangles there are in a particular scene and how dense they are. It can also show problems with geometry.

FIG. 13 illustrates an example of the texture view of images window 420. In certain embodiments, the game device may support multiple different textures for a given pixel. A different texture view can be displayed for each of these multiple different textures, with the view for a particular texture showing the contents of that texture. A combination texture view can also be displayed that shows two or more of these multiple different textures concurrently. FIG. 13 illustrates an example of an all textures window view that displays the contents of four textures at once (texture 428, texture 430, texture 432, and texture 434). It should be noted that textures can be different sizes, and in the example of FIG. 13 all four textures are displayed using the same scale (thus, texture 434 appears much smaller than textures 428, 430, and 432).

FIG. 14 illustrates an example of the overdraw view of images window 420. The overdraw view shows graphically how many times each pixel on the screen is drawn. A pixel may be drawn multiple times because of transparency or because one object occludes another object that has already been drawn. In the overdraw view, pixels are shown more brightly each time they are touched during the scene. Black pixels have not been drawn at all. The whiter the pixel, the more times it has been touched. Alternatively, other color schemes can be used. This view is useful to users so that they can see which pixels are being drawn several times during the scene. Excessive overdraw is something that game developers may try to reduce in order to make their games run faster.

FIG. 15 illustrates an example of the fill rate view of images window 420. The fill rate view shows how fast the GPU was running when each pixel was drawn. For example, if the game is using a complicated vertex or pixel shader program, each pixel takes longer to draw and the filtrate that the GPU is able to sustain is less. In this view, the more expensive pixels (those taking longer to draw) are brighter. This lets the user know which pixels are being drawn faster than other pixels.

FIG. 16 illustrates an example of a call stack window 450 that can be displayed as frame window 366 of FIG. 7. Stack trace data can be captured, as discussed above. The stack trace data captured is displayed in call stack window 450. Call stack window 450 scrolls to show the current event selected in either the timeline window (e.g., window 362 of FIG. 7) or events window (e.g., window 364 of FIG. 7). The user can specify the directory where a symbol file is located (e.g., using directory entry box 452). The information in the symbol file can then be used to identify the routine names, file names, and line numbers for the captured stack trace, which in turn can be displayed to the user.

In the example call stack window 450, the stack trace data displayed to the user shows the sequence of calls that resulted in the listed event being sent as a command to the GPU. Each line in the display corresponds to a function call in the program. The first function listed shows the function that submitted a command to the GPU that resulted in the listed event. The next line shows the function that called the first function, etc. The last function listed for each event is the top-level function in the game. The filename and line number where each function is located in the game source code is also displayed.

FIG. 17 illustrates an example of a warning window 460 that can be displayed as frame window 366 of FIG. 7. As discussed above, as data for a frame is analyzed, violations of one or more recommendations or rules may be detected. Warnings regarding such violations can be displayed in warning window 460. In the example warning window 460, a list of events in the frame and warnings (if any) for each event are shown in a table format. In certain embodiments, an icon (such as a "!") may be placed next to events in the events (e.g., window 364 of FIG. 7) to notify the user that there is a warning associated with that event. The user can then select this icon (e.g., by clicking on the icon using a cursor and cursor control device), in response to which warning window 460 is displayed as frame window 366 and the event and warning(s) in window 460 associated with that icon scrolled to (if necessary) and highlighted in window 460. Warning window 460 scrolls to show the current event selected in either the timeline window (e.g., window 362 of FIG. 7) or events window (e.g., window 364 of FIG. 7).

Each warning has a priority associated with it from 1 to 3. Priority 1 warnings are serious problems that may have a significant impact on the time it takes the game to draw a frame. Priority 2 warnings are less important but still important to consider when performance-tuning a game. Priority 3 warnings are suggestions that are good to follow but may not have a large impact on the overall performance. The user can use check boxes 462 to choose which warnings should be displayed according to their priority.

FIG. 18 illustrates an example of a pushbuffer window 464 that can be displayed as frame window 366 of FIG. 7. The pushbuffer window shows a pseudo-disassembly of the captured commands sent to the graphics processing unit for an event. The pushbuffer window shows all of the commands that were captured in for the current frame. In the window, each event that unnecessarily sets state to the same value that it previously had is marked as "Redundant". The pushbuffer window scrolls to show the current event selected in either the timeline window (e.g., window 362 of FIG. 7) or events window (e.g., window 364 of FIG. 7). Clicking on an event in the pushbuffer window will set a time cursor to the corresponding event in the timeline window (e.g., window 362 of FIG. 7) and the other windows (e.g., the events window or other windows that can be displayed as frame window 366) will update to the newly selected event.

FIG. 19 illustrates an example of a summary window 468 that can be displayed as frame window 366 of FIG. 7. The summary window provides information that applies to the entire frame. Examples of this type of information include the frame rate, a summary of state changes, overall memory usage, etc.

FIG. 20 illustrates an example of a shaders window 472 that can be displayed as frame window 366 of FIG. 7. The shaders window shows the code of the current pixel or vertex shader programs. A pull-down menu 474 can be used to select between the current pixel shader program and the current vertex shader program. The pixel and/or vertex shader code could be pseudo-code, source code, etc. A copy option 476 can also be selected by the user to have the displayed code of the current pixel and/or vertex shader programs copied to the clipboard for subsequent use with another program (e.g., word processing program or text editor).

FIG. 21 illustrates an example of a renderstates window 480 that can be displayed as frame window 366 of FIG. 7. The renderstates window 480 shows the current GPU state for render states. The states and their values for the currently selected event is displayed in window 480. When a new event is selected by the user by clicking in the Timeline window or the Events window, the renderstate values displayed change to reflect the state of the GPU at the time that event was executed.

FIG. 22 illustrates an example of a texturestates window 484 that can be displayed as frame window 366 of FIG. 7. The texturestates window 484 shows the current GPU state for texture states. The states and their values for the currently selected event is displayed in window 4840. When a new event is selected by the user by clicking in the Timeline window or the Events window, the texturestate values displayed change to reflect the state of the GPU at the time that event was executed.

FIG. 23 illustrates an example of an otherstates window 488 that can be displayed as frame window 366 of FIG. 7. The otherstates window 488 shows the current GPU state for other states (other than render states and texture states). The states and their values for the currently selected event are displayed in window 480. When a new event is selected by the user by clicking in the Timeline window or the Events window, the state values displayed change to reflect the state of the GPU at the time that event was executed.

Figure 24:
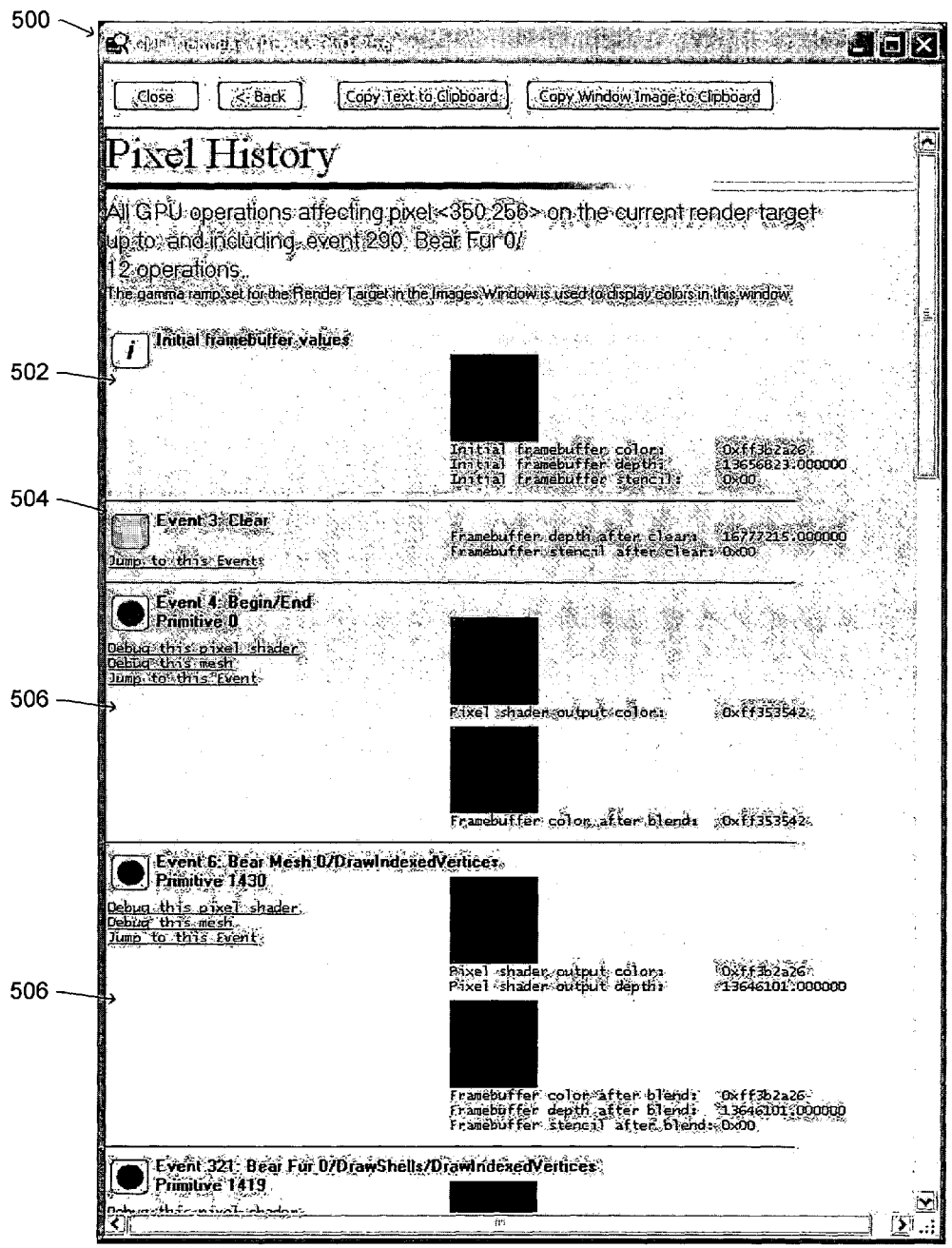
FIG. 24 illustrates an example pixel history window that can be displayed.

FIG. 24 illustrates an example pixel history window 500 that can also be displayed by the analysis control and feedback application. The pixel history window 500 is displayed as a separate window (e.g., another window in addition to windows 342, 344, and 346 of FIG. 6). Pixel history window 500 lists each event that affects a selected pixel during the frame up to the currently selected event. The pixel can be selected by the user in different manners. In one implementation, when the user clicks on the right mouse button (or other button of a cursor control device), the pixel that the cursor is over is selected and pixel history window 500 is opened.

Pixel history window 500 lists each event that affects the selected pixel during the frame, or alternatively only up to a particular point in the frame (e.g., as identified by the user). Additional information regarding each event as it affects the selected pixel is also displayed. The specific information displayed can vary based on the event. In the illustrated example of pixel history window 500, initial frame buffer values 502 are displayed. The frame then starts with a clear command, which is shown as clear event 504. Each subsequent event 506 affecting the selected pixel is also identified in window 500, as well as additional information regarding those events. For example, the pixel shader output color and frame buffer color after blending may can be identified.

Pixel history window 500 may also include links to the event, a pixel shader debugger, a vertex shader debugger, and a mesh debugger. If the link to the event is selected by the user, then that event is made the current event in the user interface (e.g., windows 362, 364, and 366 of FIG. 7) and the other windows are updated accordingly. If the pixel shader debugger link is selected by the user, then a pixel shader debugger window is opened to display information regarding the pixel shader used for the selected pixel. If the mesh debugger link is selected by the user, then a mesh debugger window is opened to display information regarding the triangle currently being drawn (as of the current event) that the selected pixel is part of.

Figure 25:
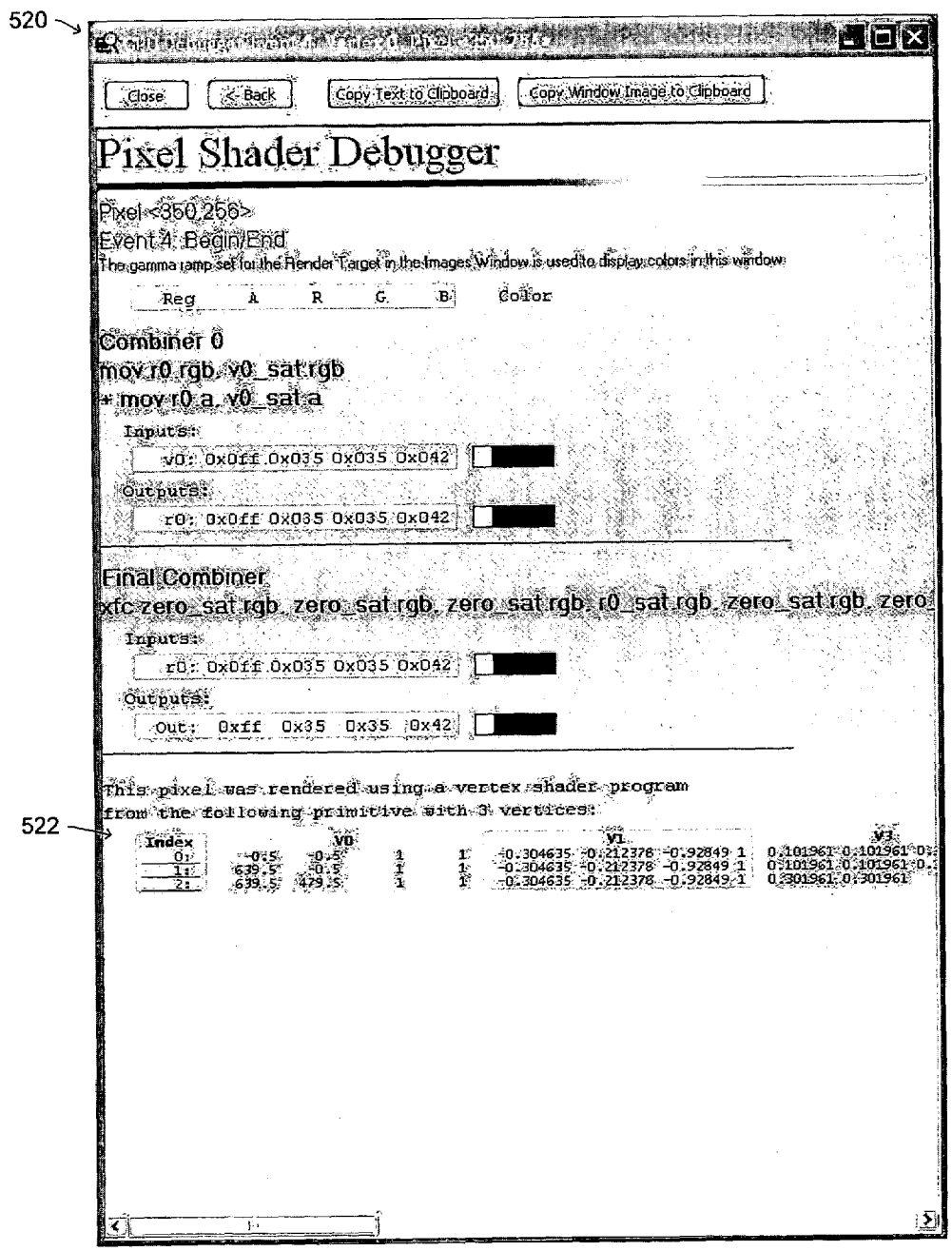
FIG. 25 illustrates an example pixel shader debugger window that can be displayed.

FIG. 25 illustrates an example pixel shader debugger window 520 that can also be displayed by the analysis control and feedback application. Pixel shader debugger window 520 is displayed in place of pixel history window 500 of FIG. 24. Clicking the "Back" button on the pixel shader debugger window causes the pixel history window to be displayed again. Pixel shader debugger window 520 shows the pixel shader program that executed for the selected pixel. The input and output register values are displayed for each instruction in the pixel shader debugger program. Pixel shader debugger window 520 allows, for example, a user to see exactly what happened when this program ran for a particular pixel and why the result might have been different than what was expected.

Pixel shader debugger window 520 also includes a vertex portion 522 that includes information regarding the vertices of the triangle currently being drawn (as part of the current event) that the selected pixel is part of. The vertex shader debugger window can be displayed in response to a user selection of such an option in window 520, such as user selection of one of the vertices identified in vertex portion 522.

Figure 26:
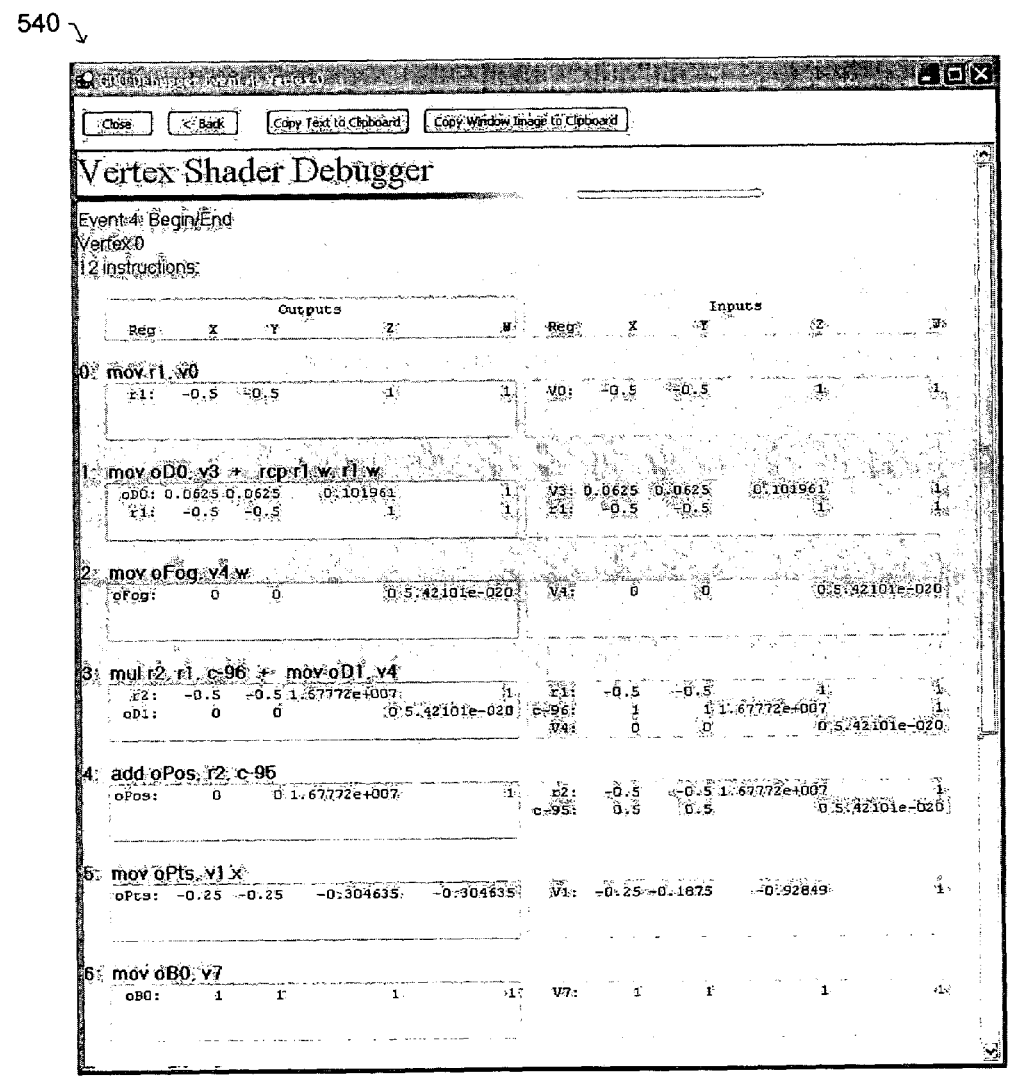

FIG. 26 illustrates an example vertex shader debugger window 540 that can also be displayed by the analysis control and feedback application. Vertex shader debugger window 540 is displayed in place of pixel history window 500 of FIG. 24. The vertex shader debugger window 540 is similar to the pixel shader debugger window 520 of FIG. 25. Vertex shader debugger window 540 displays the input and output register values for each instruction in the vertex shader program for the triangle currently being rendered.

Figure 27:
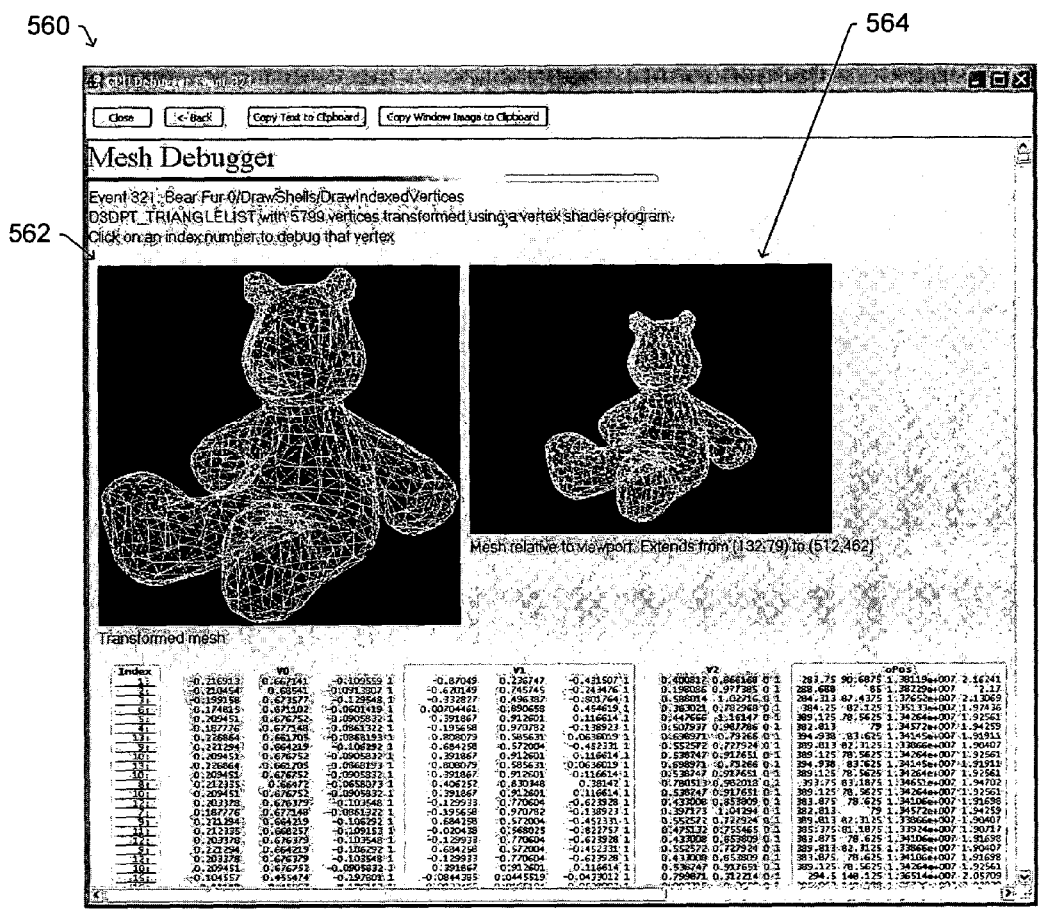
FIG. 27 illustrates an example mesh debugger window that can be displayed.

FIG. 27 illustrates an example mesh debugger window 560 that can also be displayed by the analysis control and feedback application. Mesh debugger window 560 is displayed in place of pixel history window 500 of FIG. 24. Clicking the "Back" button on the mesh debugger window causes the pixel history window to be displayed again. The mesh debugger window 560 can be launched from the pixel history window 500 of FIG. 24 as discussed above, or can be launched directly from the events window 364 of FIG. 7 (e.g., by the user clicking on the right mouse button (or other button of a cursor control device) when the cursor is over a particular event). The mesh debugger window 560 displays information about a single mesh of the frame. A mesh contains geometry information for triangles that make up an object. The mesh debugger window 560 displays two wireframe views of the mesh (the first wireframe view 562 shows the edges of every triangle in the mesh, while the second wireframe view 564 shows the edges of every triangle in the mesh relative to the screen position) and a table that shows the attribute values for each vertex in the mesh as well as the output of the vertex shader program for each vertex in the mesh. Additionally, the vertex shader debugger window 540 of FIG. 26 can be launched by clicking on the index value for a particular vertex.

It should be noted that, with reference to FIGS. 6–27 above, as different views and/or windows are selected, the selected pixel(s) and/or events remain the same. For example, a user could select a pixel in the render target view of images window 420 (of FIG. 10), and then select the shaders window 472 (of FIG. 20) to have the pixel and/or vertex shader program for that selected pixel displayed.

Although the discussions above primarily discuss facilitating performance analysis for graphics processing, the techniques described herein can similarly be used to facilitate performance analysis for other types of processors, including general purpose processors and specific purpose (e.g., dedicated) processors. The techniques described herein can be applied to virtually any processor that accepts a command stream and can be used to provide information regarding processing of the command stream. For example, the techniques described herein can be used to facilitate performance analysis for general purpose processors (e.g., CPUs). Correspondingly, the techniques described herein can be used to facilitate performance analysis for processors on other computing devices other than game devices.

Depending on the type of application being executed on the computing device and the type of processor, the capture of commands sent to the processor can vary. For example, if the application is a graphics or video application, then the application may still send commands to the processor indicating the beginning and ending of frames. Thus, the commands to be captured can be identified on a frame-by-frame basis. In other examples, the application may not issue any such indications of the beginning and ending of frames. In such situations, the beginning and ending points for capture would be identified in different manners. For example, a separate command(s) may be embedded in the application that indicate the beginning and ending of points for capture, or the capture may simply begin as soon as the request to capture is received, and then end after some amount of time (e.g., the request may indicate how long the capture should continue for, such as a length of time in milliseconds or seconds, or a number of commands to be captured, etc.).

Capturing commands for a general purpose processor can permit a great deal of information regarding processing of those commands by the processor to be returned to the application designer. For example, using the techniques described herein precise measures of how long processing of particular commands or groups of commands took can be made. By way of another example, instruction traces identifying the specific instructions executed in the captured portion can be readily determined.

Figure 28:
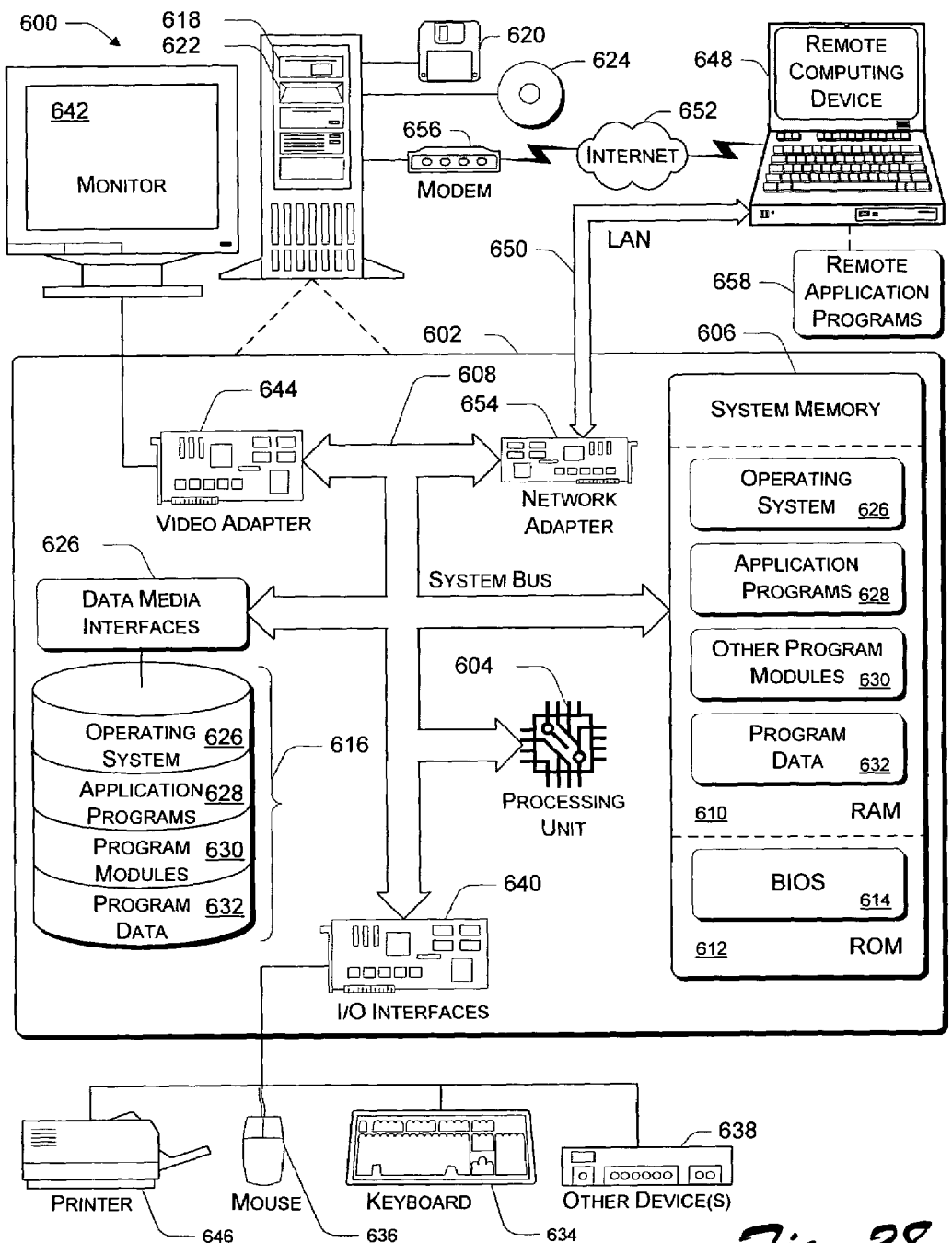
FIG. 28 illustrates an example of a general computer environment, which can be used to implement the techniques described herein.

FIG. 28 illustrates an example of a general computer environment 600, which can be used to implement the techniques described herein. The computer environment 600 is only one example of a computing environment and is not intended to suggest any limitation as to the scope of use or functionality of the computer and network architectures. Neither should the computer environment 600 be interpreted as having any dependency or requirement relating to any one or combination of components illustrated in the example computer environment 600.

Computer environment 600 includes a general-purpose computing device in the form of a computer 602. Computer 602 can be, for example, game device 152 or computing device 154 of FIG. 2, game device 200 of FIG. 3, game device 242 or computing device 244 of FIG. 4, or game device 300 of FIG. 5, and may implement process 100 of FIG. 1. The components of computer 602 can include, but are not limited to, one or more processors or processing units 604, a system memory 606, and a system bus 608 that couples various system components including the processor 604 to the system memory 606.

The system bus 608 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 602 typically includes a variety of computer readable media. Such media can be any available media that is accessible by computer 602 and includes both volatile and non-volatile media, removable and non-removable media.

The system memory 606 includes computer readable media in the form of volatile memory, such as random access memory (RAM) 610, and/or non-volatile memory, such as read only memory (ROM) 612. A basic input/output system (BIOS) 614, containing the basic routines that help to transfer information between elements within computer 602, such as during start-up, is stored in ROM 612. RAM 610 typically contains data and/or program modules that are immediately accessible to and/or presently operated on by the processing unit 604.

Computer 602 may also include other removable/non-removable, volatile/non-volatile computer storage media. By way of example, FIG. 28 illustrates a hard disk drive 616 for reading from and writing to a non-removable, non-volatile magnetic media (not shown), a magnetic disk drive 618 for reading from and writing to a removable, non-volatile magnetic disk 620 (e.g., a "floppy disk"), and an optical disk drive 622 for reading from and/or writing to a removable, non-volatile optical disk 624 such as a CD-ROM, DVD-ROM, or other optical media. The hard disk drive 616, magnetic disk drive 618, and optical disk drive 622 are each connected to the system bus 608 by one or more data media interfaces 626. Alternatively, the hard disk drive 616, magnetic disk drive 618, and optical disk drive 622 can be connected to the system bus 608 by one or more interfaces (not shown).

The disk drives and their associated computer-readable media provide non-volatile storage of computer readable instructions, data structures, program modules, and other data for computer 602. Although the example illustrates a hard disk 616, a removable magnetic disk 620, and a removable optical disk 624, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on the hard disk 616, magnetic disk 620, optical disk 624, ROM 612, and/or RAM 610, including by way of example, an operating system 626, one or more application programs 628, other program modules 630, and program data 632. Each of such operating system 626, one or more application programs 628, other program modules 630, and program data 632 (or some combination thereof) may implement all or part of the resident components that support the distributed file system.

A user can enter commands and information into computer 602 via input devices such as a keyboard 634 and a pointing device 636 (e.g., a "mouse"). Other input devices 638 (not shown specifically) may include a microphone, joystick, game pad, satellite dish, serial port, scanner, and/or the like. These and other input devices are connected to the processing unit 604 via input/output interfaces 640 that are coupled to the system bus 608, but may be connected by other interface and bus structures, such as a parallel port, game port, or a universal serial bus (USB).

A monitor 642 or other type of display device can also be connected to the system bus 608 via an interface, such as a video adapter 644. In addition to the monitor 642, other output peripheral devices can include components such as speakers (not shown) and a printer 646 which can be connected to computer 602 via the input/output interfaces 640.

Computer 602 can operate in a networked environment using logical connections to one or more remote computers, such as a remote computing device 648. By way of example, the remote computing device 648 can be a personal computer, portable computer, a server, a router, a network computer, a peer device or other common network node, and the like. The remote computing device 648 is illustrated as a portable computer that can include many or all of the elements and features described herein relative to computer 602.

Logical connections between computer 602 and the remote computer 648 are depicted as a local area network (LAN) 650 and a general wide area network (WAN) 652. Such networking environments are commonplace in offices, enterprise-wide computer networks, intranets, and the Internet.

When implemented in a LAN networking environment, the computer 602 is connected to a local network 650 via a network interface or adapter 654. When implemented in a WAN networking environment, the computer 602 typically includes a modem 656 or other means for establishing communications over the wide network 652. The modem 656, which can be internal or external to computer 602, can be connected to the system bus 608 via the input/output interfaces 640 or other appropriate mechanisms. It is to be appreciated that the illustrated network connections are examples and that other means of establishing communication link(s) between the computers 602 and 648 can be employed.

In a networked environment, such as that illustrated with computing environment 600, program modules depicted relative to the computer 602, or portions thereof, may be stored in a remote memory storage device. By way of example, remote application programs 658 reside on a memory device of remote computer 648. For purposes of illustration, application programs and other executable program components such as the operating system are illustrated herein as discrete blocks, although it is recognized that such programs and components reside at various times in different storage components of the computing device 602, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

One or more flowcharts are described herein and illustrated in the accompanying Figures. The ordering of acts in these flowchart(s) are examples only—these orderings can be changed so that the acts are performed in different orders and/or concurrently.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method comprising:
   identifying a set of commands to be submitted to a processing unit, wherein the set of commands were captured and saved as they were previously submitted to the processing unit, and wherein the processing unit comprises a graphics processing unit;
   selecting a subset of the set of commands;
   submitting the subset of the set of commands to the processing unit for processing;
   analyzing processing performed by the processing unit in response to the subset of the set of commands
   analyzing the set of commands;
   determining, based on the analysis of the set of commands whether one or more recommendations for using the graphics processing unit are violated by the set of commands;
   if one or more recommendations are violated by the set of commands then:
      selecting one of the violated recommendations;
      determining how much faster a frame could have been drawn if the selected recommendation had not been violated; and
      issuing a warning identifying both the selected recommendation that has been violated and how much faster the frame could have been drawn if the selected recommendation had not been violated.

2. A method as recited in claim 1, wherein the analyzing processing performed by the processing unit comprises measuring an amount of time taken for the subset of the set of commands to be processed.

3. A method as recited in claim 1, wherein the analyzing processing performed by the processing unit comprises showing how a scene would be drawn using only the subset of the set of commands.

4. A method as recited in claim 1, wherein the set of commands comprises commands to be submitted to the graphics processing unit to have a frame drawn.

5. A method as recited in claim 1, further comprising:
setting the processing unit, prior to submitting the subset of the set of commands to the processing unit, to a particular state, wherein the particular state is a same state as the processing unit was in at the time capture of the set of commands began.

6. A method as recited in claim 1, further comprising modifying one or more of the subset of the set of commands prior to submitting the subset of the set of commands to the processing unit.

7. One or more computer readable media having one or more instructions that, when executed by one or more processors, causes the one or more processors to:
modify a stream of commands that were captured and saved as they were previously submitted to a processing unit, wherein the processing unit comprises a graphics processing unit, and wherein the stream of commands comprises commands previously submitted to the graphics processing unit to have a frame of video drawn;
submit the modified stream of commands to the processing unit; and
determine a difference between a first amount of time required by the processing unit to process the stream of commands and a second amount of time required by the processing unit to process the modified stream of commands, wherein the first amount of time required by the processing unit to process the stream of commands comprises the amount of time required by the graphics processing unit to draw the frame using the stream of commands and wherein the second amount of time required by the processing unit to process the modified stream of commands comprises the amount of time required by the graphics processing unit to draw the frame using the modified stream of commands.

8. One or more computer readable media as recited in claim 7, wherein to modify the stream of commands is to remove one or more redundant commands.

9. One or more computer readable media as recited in claim 7, wherein to modify the stream of commands is to change one or more instructions of an internal program of the processor to reveal a value of an internal variable of the internal program.

10. One or more computer readable media as recited in claim 7, wherein the instructions further cause the one or more processors to set the processing unit, prior to submission of the modified stream of commands to the processing unit, to a particular state, wherein the particular state is a same state as the processing unit was in at the time capture of the stream of commands began.

11. One or more computer readable media as recited in claim 7, wherein the instructions further cause the one or more processors to:
analyze the stream of commands;
determine, based on the analysis, whether one or more recommendations for using the processing unit are violated by the stream of commands;
if one or more recommendations are violated by the stream of commands, then:
use, as the modified stream of commands, the stream of commands as modified to no longer violate a selected one of the one or more recommendations;
issue a warning identifying both the selected recommendation that had been violated and an indication of the difference.

12. One or more computer readable media having one or more instructions that, when executed by one or more processors, causes the one or more processors to:
capture a state of a graphics processing unit;
capture a plurality of commands submitted to the graphics processing unit in order to draw a frame of video, wherein to capture the plurality of commands is to:
identify a memory location referenced by one of the plurality of commands;
capture the contents of the memory location;
determine whether the memory location was referenced by a previous one of the plurality of commands;
if the memory location was not referenced by a previous one of the plurality of commands, then capture the contents of the memory location; and
if the memory location was referenced by a previous one of the plurality of commands, then check whether the contents of the memory location are the same as the contents of the memory location when the memory location was referenced by the previous command, and capture the contents of the memory location only if the contents of the memo location are not the same as the contents of the memory location when the memory location was referenced by the previous command; and
save both the captured state and the captured plurality of commands.

13. One or more computer readable media as recited in claim 12, wherein the one or more instructions further cause the one or more processors to perform the captures and save in response to a request to capture the frame, wherein the request is received from a remote computing device.

14. One or more computer readable media as recited in claim 12, wherein to capture the state of the graphics processing unit is to obtain the settings of all registers of the graphics processing unit.

15. One or more computer readable media as recited in claim 12, wherein the one or more instructions further cause the one or more processors to capture timing data regarding how fast portions of the frame of video are drawn.

* * * * *